United States Patent
Hori

(10) Patent No.: US 9,507,677 B2
(45) Date of Patent: Nov. 29, 2016

(54) STORAGE CONTROL DEVICE, STORAGE APPARATUS, AND COMPUTER-READABLE RECORDING MEDIUM HAVING STORAGE CONTROL PROGRAM STORED THEREIN

(71) Applicant: FUJITSU LIMITED, Kawasaki-shi, Kanagawa (JP)

(72) Inventor: Takashi Hori, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 14/501,173

(22) Filed: Sep. 30, 2014

(65) Prior Publication Data
US 2015/0121129 A1    Apr. 30, 2015

(30) Foreign Application Priority Data
Oct. 25, 2013  (JP) .................................. 2013-222061

(51) Int. Cl.
G06F 11/14     (2006.01)
G06F 11/20     (2006.01)
G06F 11/16     (2006.01)

(52) U.S. Cl.
CPC ........ *G06F 11/2092* (2013.01); *G06F 11/1658* (2013.01)

(58) Field of Classification Search
CPC ........... G06F 11/2092; G06F 11/1658; G06F 11/2005; G06F 11/201; G06F 11/2035; G06F 13/385; G06F 3/0613; G06F 3/0635; G06F 3/0659
See application file for complete search history.

(56) References Cited

U.S. PATENT DOCUMENTS

| | | | | |
|---|---|---|---|---|
| 6,643,795 B1 * | 11/2003 | Sicola | ................. | G06F 11/2069 714/11 |
| 6,944,684 B1 | 9/2005 | Kinjo et al. | | |
| 7,111,189 B1 * | 9/2006 | Sicola | ................. | G06F 11/2092 714/15 |
| 7,536,508 B2 * | 5/2009 | Davies | ................. | G06F 3/0617 711/114 |
| 8,909,816 B2 * | 12/2014 | Gonen | ............... | G06F 11/0727 710/5 |
| 2003/0188035 A1 * | 10/2003 | Lubbers | .............. | G06F 11/1666 719/310 |
| 2008/0005470 A1 * | 1/2008 | Davies | ................. | G06F 3/0617 711/114 |
| 2008/0005614 A1 | 1/2008 | Lubbers et al. | | |

FOREIGN PATENT DOCUMENTS

JP   2001-43026   2/2001
JP   2008-59558   3/2008

* cited by examiner

*Primary Examiner* — Nadeem Iqbal
(74) *Attorney, Agent, or Firm* — Fujitsu Patent Center

(57) ABSTRACT

Each CM includes an interface unit, a first detection unit, and a reset control unit. The interface unit is configured to be connected to a communication channel and control communication using the communication channel. The first detection unit is configured to detect an abnormality in an inter-CM path including the interface unit of the CM, to which the first detection unit belongs, the interface unit of the other CM, and the communication channel. The reset control unit is configured to retract the other CM and reset the interface unit of the one CM in a case where an abnormality of the other CM side is detected by the first detection unit. Accordingly, even in a case where a suspicious control unit in which an abnormality has occurred is erroneously specified, the maintenance of the suspicious control unit can be performed with the operation being continued.

20 Claims, 14 Drawing Sheets

US 9,507,677 B2

STORAGE CONTROL DEVICE, STORAGE APPARATUS, AND COMPUTER-READABLE RECORDING MEDIUM HAVING STORAGE CONTROL PROGRAM STORED THEREIN

CROSS-REFERENCE TO RELATED APPLICATION

This application is based upon and claims the benefit of priority of the prior Japanese Application No. 2013-222061 filed on Oct. 25, 2013 in Japan, the entire contents of which are hereby incorporated by reference.

FIELD

The present invention relates to a storage control device, a storage apparatus, and a computer-readable recording medium having a storage control program stored therein.

BACKGROUND

A storage apparatus, for example, is configured by a disk array apparatus. In the disk array apparatus, a redundant arrays of inexpensive drives (RAID) technology for combining a plurality of disks (hard disk drives (HDD) or the like) and managing the combined disks as one virtual disk (RAID group) is employed. By employing the RAID technology, the loss of data stored in a disk and the like are prevented. In addition, according to the RAID technology, the data arrangement and the redundancy in each disk differ in accordance with the level (RAID 1 to 6) of the RAID.

A RAID apparatus refers to a disk array apparatus using the RAID technology. In the RAID apparatus, from the viewpoint of data assurance, control units controlling the RAID apparatus are configured to be redundant, and one pair of the control units is mounted. Each of the control units is called a controller module (hereinafter, referred to as a CM). Each CM controls a storage unit including a plurality of disks described above in accordance with input/output requests (I/O requests and commands) from a host apparatus.

One pair of CMs are connected together so as to be communicable with each other through a communication channel (data transmission channel). As the communication channel, for example, a peripheral components interconnect express (PCIe) is used. In each CM, a PCIe switch (PCIeSW) that is connected to the communication channel and controls communication using the communication channel is provided. Here, a path binding CMs including the communication channel and PCIeSWs connected to both ends of the communication channel is called an inter-CM path. Hereinafter, one pair of CMs may be denoted by CM #0 and CM #1.

In a case where an abnormality occurs in the PCIeSW of one of the one pair of CMs, a normal CM of the other side retracts (degenerates) a suspicious CM (abnormal CM) including the PCIeSW in which the abnormality occurs so as to be cut off, and the operation of the RAID apparatus is continuously performed in accordance with only the normal CM.

However, in a case where an abnormality occurs on an inter-CM path, according to the characteristics of the PCIe, it is difficult to precisely specify one in which the abnormality occurs out of the one pair of CMs. However, since one having a higher possibility of the occurrence of an abnormality out of the one pair of CMs can be determined, the CM having the higher possibility of the occurrence of an abnormality is specified as a suspicious CM.

Accordingly, there is a possibility that a normal CM is erroneously specified as a suspicious CM. Here, an operation of a case will be described with reference to reference signs A1 to A8 illustrated in FIG. 14 in which a normal CM #1 is erroneously specified as a suspicious CM although an abnormality actually occurs in the PCIeSW of the CM #0. FIG. 14 is a sequence diagram that illustrates the operation. In a case where an inter-CM path abnormality (see reference sign A1) occurring on the CM #0 side is detected with the CM #1 being a suspicious CM (see reference sign A2), the normal CM #1 is retracted so as to be cut off from the RAID apparatus (see reference sign A3), and the maintenance of the cut CM #1 is performed (see reference sign A4).

On the other hand, the survived CM #0 continues the operation of the RAID apparatus while allowing the abnormality to remain in the PCIeSW. At this time, even when the abnormality remains in the PCIeSW of the survived CM #0, the survived CM #0 does not perform communication between CMs using the inter-CM path. Accordingly, the operation can be continued using only one CM without affecting the operation of the RAID apparatus.

However, when the maintenance of the suspicious CM #1 that has been erroneously specified is performed, CM #1 after the maintenance is inserted into the RAID apparatus, and the communication between the CMs using the inter-CM path is restarted, due to the abnormality of the PCIeSW remaining in the CM #0, and thus a communication abnormality occurs again (see reference sign A5). Accordingly, again, the CM #1 after the maintenance is erroneously specified as a suspicious CM, and the CM#1 after the maintenance is retracted and cut off (see reference sign A6). In a case where the maintenance fails as above, the power of the RAID apparatus is turned off, and, after the maintenance/replacement of the CM #0 is performed (see reference sign A7), the power of the RAID apparatus is re-input (see reference sign A8).

As described above, in a case where a normal CM is erroneously specified as a suspicious CM, the power of the RAID apparatus is turned off and maintenance/replacement of the CM is performed. Accordingly, there is a problem in that the operation of the RAID apparatus (system) needs to be stopped.

SUMMARY

A storage control device according to the present invention includes: one pair of control units configured to control a storage unit in accordance with an input/output request from a host apparatus; and a communication channel configured to connect the one pair of control units to be communicable with each other. Each of the one pair of control units includes: an interface unit; a first detection unit; and a reset control unit. The interface unit is configured to be connected to the communication channel and control communication using the communication channel. The first detection unit is configured to detect an abnormality in an inter-control unit path including the interface unit of one control unit, to which the first detection unit belongs, of the one pair of control units, the interface unit of the other control unit of the one pair of control units, and the communication channel. The reset control unit is configured to retract the other control unit and reset the interface unit of the one control unit in a case where an abnormality of the other control unit side is detected by the first detection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE PREFERRED EMBODIMENTS

Figure 1:
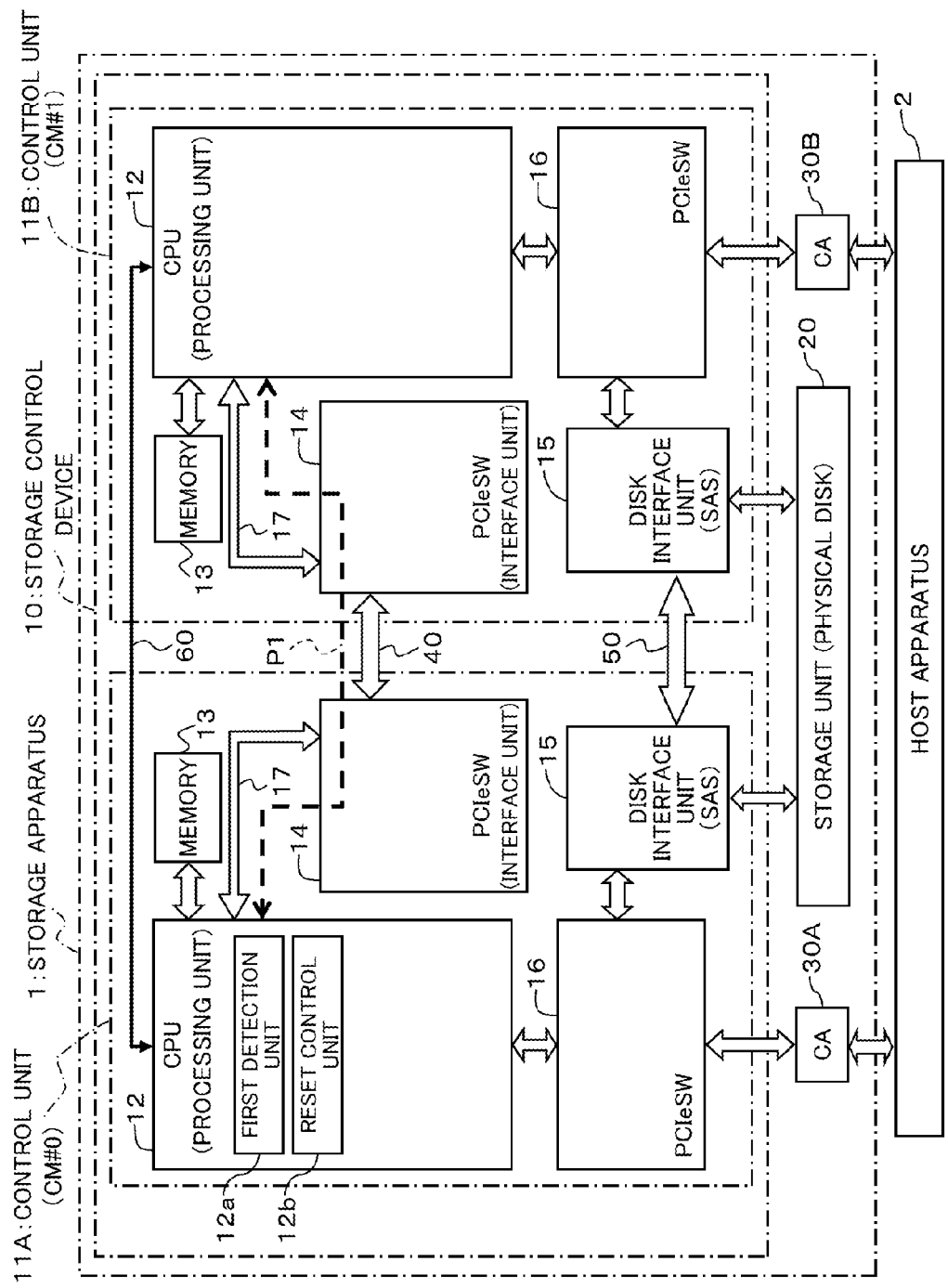
FIG. 1 is a block diagram that illustrates the hardware configuration and the functional configuration of a storage apparatus (RAID apparatus) including a storage control device as a first embodiment.

Hereinafter, a storage control device, a storage apparatus, and a computer-readable recording medium, which has a storage control program stored therein, according to embodiments of the present invention will be described in detail with reference to the drawings. However, the embodiments described below are merely examples, and there is no intention of excluding the applications of various modified examples or various technologies that are not explicitly described in the embodiments. In other words, in the embodiments, various changes can be made in a range not departing from the concept thereof. In addition, each diagram is not intended to include only constituent elements that are represented in the drawing but may include other functions. Furthermore, the embodiments may be appropriately combined in a range in which the contents of the process are not contradictory.

[1] First Embodiment

Figure 2:
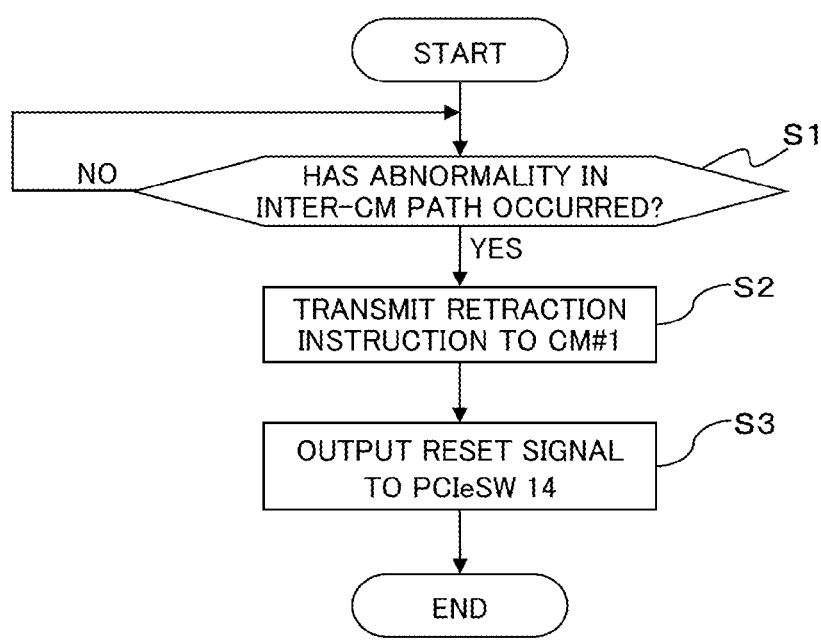
FIG. 2 is a flowchart that illustrates the operation of the storage control device illustrated in FIG. 1.
Figure 3:
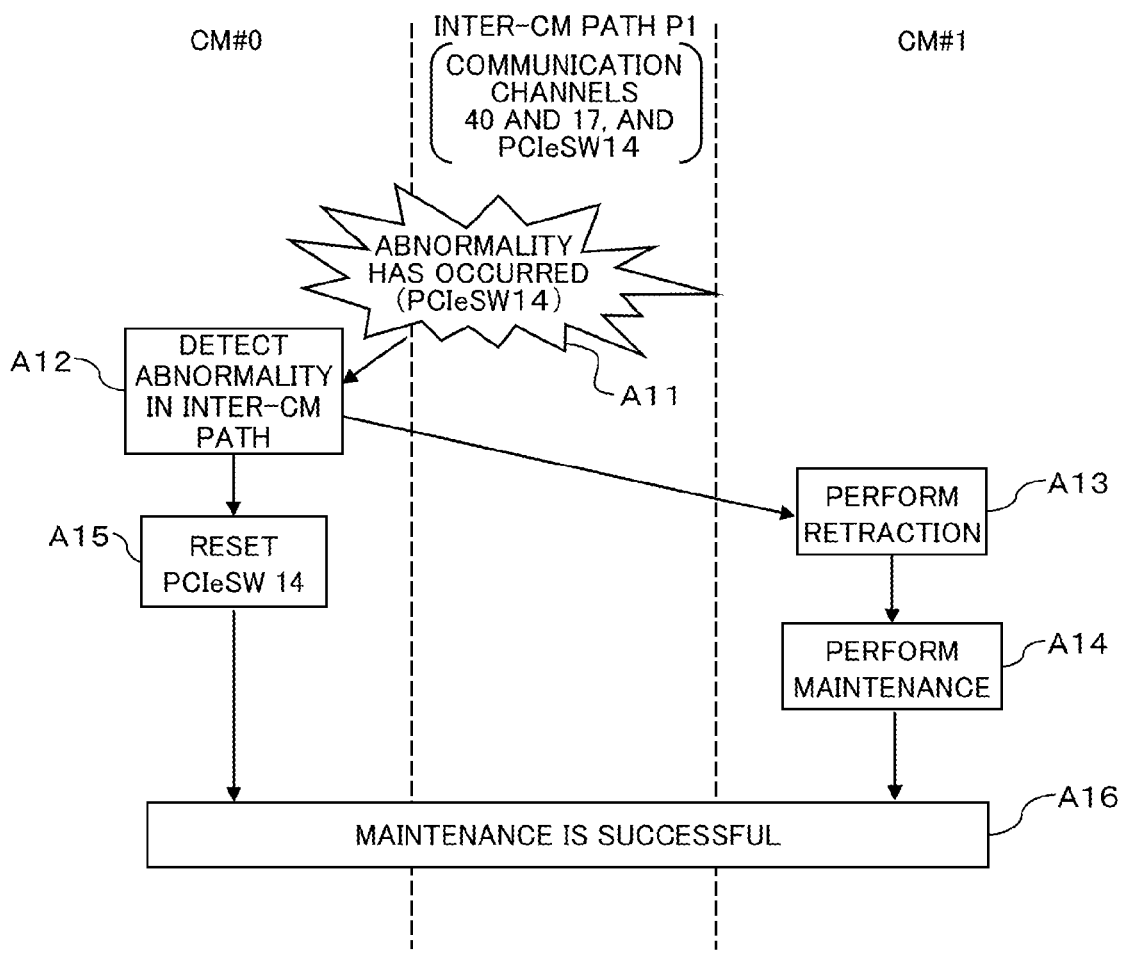
FIG. 3 is a sequence diagram that illustrates the operation (an example of successful maintenance according to resetting of a PCIeSW) of the storage control device illustrated in FIG. 1.

First, a first embodiment will be described with reference to FIGS. 1 to 3.

[1-1] Configuration of First Embodiment

FIG. 1 is a block diagram that illustrates the hardware configuration and the functional configuration of a storage apparatus (RAID apparatus) 1 including a storage control device 10 as the first embodiment.

The storage apparatus 1 illustrated in FIG. 1 virtualizes one or more storage devices (physical disks; not illustrated in the figure) stored in a storage unit 20, thereby forming a virtual storage environment. Then, the storage apparatus 1 provides a virtual volume for a host apparatus 2 that is a higher-level apparatus.

The storage apparatus 1 is connected to one or more (in the example illustrated in FIG. 1, one) host apparatuses 2 to be communicable therewith. In the example illustrated in FIG. 1, two ports of the host apparatus 2 are connected to one pair of communication adapters (CAs) 30A and 30B of the storage apparatus 1.

The host apparatus 2, for example, is an information processing apparatus having a server function and transmits and receives commands of a network attached storage (NAS) and a storage area network (SAN) to/from the storage apparatus 1. The host apparatus 2, for example, transmits a disk access command such as a read command or a write command of the NAS to the storage apparatus 1, thereby performing writing or reading data into/from a volume provided by the storage apparatus 1.

Then, in accordance with an input/output request (for example, a read command or a write command) performed for the volume from the host apparatus 2, the storage apparatus 1 performs the process of data reading, data writing, or the like for an actual storage corresponding to the volume. Here, the input/output request from the host apparatus 2 may be referred to as an I/O request, an I/O command, or a host I/O.

The storage apparatus 1, as illustrated in FIG. 1, includes a storage control device 10, a storage unit 20, and one pair of CAs 30A and 30B.

The CAs 30A and 30B are network adapters connecting to the host apparatus 2 in a communicable manner and, for example, are local area network (LAN) interfaces, internet small computer system interfaces (iSCSIs), or fiber channel (FC) interfaces. The CAs 30A and 30B receive data transmitted from the host apparatus 2 or transmit data output from CMs 11A and 11B to be described later to the host apparatus 2. In other words, the CAs 30A and 30B control the input/output (I/O) of data to/from the host apparatus 2.

The storage unit 20 can mount one or more storage devices (physical disks) and provides a storage area (an actual volume or an actual storage) of the one or more storage devices for the storage apparatus 1. For example, the storage unit 20 includes a plurality of stages of slots (not illustrated in the figure), and, by inserting a storage device such as a hard disk drive (HDD) or a solid state drive (SSD) into such a slot, the actual volume capacity can be changed at any time. In addition, the RAID can be configured by using a plurality of storage devices.

The storage control device 10 includes one pair of redundant CMs (control units) 11A and 11B that control the storage unit 20 in accordance with an I/O request from the host apparatus 2 and a communication channel (data transmission channel) 40 that connects the CMs 11A and 11B to be communicable with each other. In other words, the one pair of CMs 11A and 11B are connected through the communication channel 40 so as to be communicable with each other. As the communication channel 40, for example, a PCIe is used.

The one pair of CMs 11A and 11B are connected to the host apparatus 2 through the CAs 30A and 30B so as to be communicable with each other and performs reception of an I/O request, transmission/reception of data, and the like. In addition, one storage unit 20 is connected to the one pair of CMs 11A and 11B, and any one of CMs 11A and 11B can perform data reading or data writing by accessing the storage unit 20. In other words, by connecting the CMs 11A and 11B to the storage unit 20, access paths to the storage unit 20 are configured to be redundant.

In addition, in a case where a logical unit that is an access target of the I/O request issued from the host apparatus 2 to the CM 11A through the CA 30A is the management target of the CM 11A, the process for the storage unit 20 according to the I/O request is performed by the CM 11A. On the other hand, in a case where a logical unit that is the access target is not the management target of the CM 11A, the I/O request is transmitted from the CM 11A to the CM 11B through communication between CMs using the communication channel 40, and the process for the storage unit 20 according to the I/O request is performed by the CM 11B.

Similarly, in a case where a logical unit that is an access target of the I/O request issued from the host apparatus 2 to the CM 11B through the CA 30B is the management target of the CM 11B, the process for the storage unit 20 according to the I/O request is performed by the CM 11B. On the other hand, in a case where the logical unit that is the access target is not the management target of the CM 11B, the I/O request is transmitted from the CM 11B to the CM 11A through communication between CMs using the communication channel 40, and the process for the storage unit 20 according to the I/O request is performed by the CM 11A.

Here, whether the logical unit of the access target is the management target of either the CM 11A or the CM 11B is determined based on logical unit information stored in the CM 11A or 11B. The logical unit information is information specifying the logical unit that is the management target of the CM 11A or 11B and, for example, is a logical unit number (LUN) and is registered and stored in advance in a memory 13 (to be described later) of the CM 11A or 11B. The LUN stored in the memory 13 as described above is used as information for receiving an I/O request issued by the host apparatus 2. In other words, the CM 11A or 11B receives an I/O request directed to the LUN that is stored in the memory 13 from the host apparatus 2 and processes the received I/O request.

The CMs 11A and 11B are controllers that control the storage apparatus 1 and perform various controls such as an access control of the storage unit 20 and the like in accordance with an I/O request (a command such as a read/write command) received from the host apparatus 2 through the CAs 30A and 30B. The CMs 11A and 11B have configurations that are almost the same. Hereinafter, as a reference sign that represents the CMs, when it is necessary to specify each one of a plurality of the CMs, the reference signs 11A and 11B will be used. On the other hand, when an arbitrary CM is represented, a reference sign 11 will be used. The CMs 11A and 11B may be represented respectively as CM #0 and CM #1.

The CM 11, as illustrated in FIG. 1, includes: a central processing unit (CPU) 12; the memory 13, PCIeSWs 14 and 16; and a disk interface unit 15.

The memory 13 is a storage device that temporarily stores various kinds of data and programs and has a memory area and a cache area not illustrated in the figure. The cache area temporarily stores data received from the host apparatus 2 and data transmitted to the host apparatus 2. The memory area is used for temporarily storing or expanding data or a program when the CPU 12 executes the program. The above-described LUN is stored in the memory area.

The PCIeSW 14 is an interface unit that is connected to the communication channel 40 of the PCIe and controls communication using the communication channel 40 and serves as a bridge that connects the CPU 12 and the communication channel 40 together. The communication channel (inter-PCIeSW communication channel) 40 connects the PCIeSW 14 of the CM 11A and the PCIeSW 14 of the CM 11B together so as to be communicable with each other. In addition, the PCIeSW 14 and the CPU 12 are connected together so as to be communicable with each other through a communication channel (a communication channel between the CPU and the PCIeSW) 17 of the PCIe. In this embodiment, a path binding the CPU 12 of the CM 11A and the CPU 12 of the CM 11B is referred to as an inter-CM path (inter-control unit path; inter-CPU path) P1. In other words, the inter-CM path P1 of this embodiment includes the communication channel 17 and the PCIeSW 14 arranged on the CM 11A side, the communication channel 40, and the communication channel 17 and the PCIeSW 14 arranged on the CM 11B side.

The disk interface unit (SAS interface unit) 15 is connected to the storage device or the like of the storage unit 20 in a communicable manner and, for example, is a serial attached small computer system interface (SCSI) (SAS). In addition, the SAS interface unit 15 is connected to a communication channel 50 of the SAS and serves also as an interface unit that controls communication using the communication channel 50. The communication channel (inter-SAS interface unit communication channel) 50 connects the SAS interface unit 15 of the CM 11A and the SAS interface unit 15 of the CM 11B together so as to be communicable with each other.

The PCIeSW 16 serves as a bridge that connects the CA 30A or 30B, the CPU 12, and the SAS interface unit 15 together. In other words, the CPU 12, the host apparatus 2, and the storage unit 20 are connected together through the PCIeSW 16 so as to be communicable with each other. In other words, under the control of the CPU 12, data writing or data reading is performed in accordance with an I/O request transmitted from the host apparatus 2 through the PCIeSW 16 and the SAS interface unit 15. In this way, data writing or data reading can be performed for the storage unit 20 from any one of the CMs 11A and 11B.

The CPU (processing unit) 12 is a processing unit that performs various control and calculation operations and is a multi-core processor (multiple CPUs). The CPU 12 executes an operating system (OS) or a program that is stored in the memory 13 or the like, thereby realizing various functions.

Particularly, the CPU 12 of the first embodiment executes a predetermined storage control program, thereby serving as a first detection unit 12a and a reset control unit 12b to be described later. In FIG. 1, while the first detection unit 12a and the reset control unit 12b are illustrated only in the CPU 12 of the CM 11A, the first detection unit 12a and the reset control unit 12b are included also in the CPU 12 of the CM 11B.

The first detection unit 12a detects an abnormality on the inter-CM path P1 described above. As described above, in a case where an abnormality occurs on the inter-CM path P1 employing the PCIe, according to the characteristics of the PCIe, it is difficult to precisely specify one in which the abnormality occurs out of the one pair of the CMs 11A and 11B. However, one having a higher possibility of the occurrence of the abnormality out of the one pair of the CMs 11A and 11B can be determined. Accordingly, in a case where an abnormality on the inter-CM path P1 has been detected, the first detection unit 12a specifies and detects one having a higher possibility of the occurrence of the abnormality out of the CMs 11A and 11B as a suspicious CM (abnormal CM).

In a case where an abnormality of the other CM (the other control unit) side is detected by the first detection unit 12a, the reset control unit 12b retracts (degenerates) the other CM and resets the PCIeSW (interface unit) 14 of the CM to which the reset control unit 12b belongs. In other words, in a case where an abnormality of the other CM 11B side is detected by the first detection unit 12a of the CM 11A to which the reset control unit 12b belongs, the reset control unit 12b of the CM 11A transmits a signal for giving an instruction for retraction (degeneracy) from the CPU 12 of the CM 11A to the CPU 12 of the CM 11B. In addition, the reset control unit 12b of the CM 11A resets the PCIeSW 14 of the CM 11A to which it belongs by transmitting a reset signal to the PCIeSW 14 of the CM 11A described above through the communication channel 17. Here, the transmission of the retraction instruction signal from the CM 11A to the CM 11B, for example, is performed through an inter-integrated circuit (I2C) signal line 60 that is a serial communication channel connecting the CMs 11A and 11B to be communicable with each other.

Hereinafter, while the operation of a case where the CM 11A (CM #0) is the master (subject) will be described, it is apparent that the operation is performed to be similar to the case where the CM 11A is the master also in a case where the CM 11B (CM #1) is the mater. Accordingly, detailed description of the operation of the case where the CM 11B is the master will not be presented. In addition, hereinafter, resetting of the PCIeSW 14 may be referred to as PCIeSW resetting.

[1-2] Operation of First Embodiment

Next, the operation of the storage control device 10 illustrated in FIG. 1 will be described along a flowchart (Steps S1 to S3) illustrated in FIG. 2.

The first detection unit 12a of the CM 11A (CM #0) monitors the occurrence of an abnormality on the inter-CM path P1 during the operation of the storage apparatus 1 in Step S1. In a case where the first detection unit 12a detects an abnormality on the inter-CM path P1 and specifies the other CM 11B (CM #1) as a suspicious CM (abnormal CM) having a higher possibility of the occurrence of the abnormality (Yes route of Step S1), the reset control unit 12b operates as below.

A retraction instruction signal is transmitted from the CM #0 (CPU 12) to the CM #1 (CPU 12) through the I2C signal line 60 by the reset control unit 12b of the CM #0 in Step S2. In addition, a reset signal is transmitted from the CPU 12 to the PCIeSW 14 of the CM #0 through the communication channel 17 by the reset control unit 12b of the CM #0 in Step S3. Here, the process of Step S2 and the process of Step S3 may be performed in order that is opposite to the above-described order or may be performed simultaneously.

Here, a maintenance operation will be described in a case where the normal CM #1 is erroneously specified as a suspicious CM (abnormal CM) while an abnormality actually occurs in the PCIeSW 14 of the CM #0 with reference to Steps S1 to S3 illustrated in FIG. 2 and reference signs A11 to A16 illustrated in FIG. 3. FIG. 3 is a sequence diagram that illustrates the operation (an example of the successful maintenance according to the PCIeSW resetting) of the storage control device 10 illustrated in FIG. 1. At this time, it is assumed that the abnormality that has occurred in the PCIeSW 14 of the CM #0 is an abnormality (for example, an intermittent fault or a software error) that can be resolved by the resetting operation.

When an abnormality (see reference sign A11) of the inter-CM path P1 that has occurred on the CM #0 side is detected with the CM #1 being a suspicious CM (see reference sign A12; Yes route of Step S1), a retraction instruction signal is transmitted from the CM #0 to the CM #1 (see Step S2). When the retraction instruction signal is received by the CM #1, the CM #1 is retracted (stopped) and is cut off from the storage apparatus 1 (see reference sign A13), and then, the maintenance of the suspicious CM #1 is performed, and the CM #1 after the maintenance is inserted into the storage apparatus 1 (see reference sign A14).

Meanwhile, in the survived CM #0, the PCIeSW 14 in which the abnormality remains is reset in accordance with a reset signal transmitted from the CPU 12 of the CM #0 to which it belongs (see reference sign A15; Step S3). About 90% of abnormalities occurring in the PCIeSW 14 are abnormalities (an intermittent fault, a software error, and the like) that can be resolved by the resetting operation. Accordingly, by performing the PCIeSW resetting as described above, about 90% of abnormalities remaining in the PCIeSW 14 are resolved.

While the retraction and the maintenance of the CM #1 and the PCIeSW resetting of the CM #0 are performed, the CM #0 continues to operate the storage apparatus 1 independently without performing communication between CMs. Then, when the CM #1 after the maintenance is inserted into the storage control device 10, the communication between CMs is restarted, and the maintenance is successful (see reference sign A16), the storage control device 10 is returned to a normal operation according to the CM #0 and the CM #1.

On the other hand, in a case where, although the resetting of the PCIeSW of the CM#0 and the maintenance of the CM#1 are performed, the communication between the CMs is not restarted, and the maintenance is unsuccessful, it is regarded that the abnormality of the PCIeSW 14 of the CM #0 is not resolved by the resetting operation but remains. Accordingly, in this case, the power of the storage apparatus 1 is turned off, and the maintenance and the replacement of the CM #0 are performed, and then, the power is re-input to the storage apparatus 1.

[1-3] Advantage of First Embodiment

According to the storage control device 10 and the storage apparatus 1 of the first embodiment, in a case where an abnormality of the CM #1 of the one pair of CMs #0 and #1 is detected, the retraction and the maintenance of the CM #1 are performed, and the resetting of the PCIeSW of the CM#0 is performed. In a case where an abnormality such as an intermittent fault or a software error remains in the PCIeSW 14 of the CM #0, by resetting the PCIeSW, the abnormality is resolved.

Accordingly, even in a case where a suspicious CM in which an abnormality occurs is erroneously specified, the maintenance of the suspicious CM can be performed with the operation of the storage apparatus 1 being continued. Particularly, by resetting the PCIeSW, most of abnormalities of the PCIeSW 14 are resolved. Accordingly, a possibility that a portion, in which an abnormality on the inter-CM path P1 occurs, is erroneously specified, and the operation of the storage apparatus 1 is caused to stop can be markedly lowered.

[2] Second Embodiment

Next, a second embodiment will be described with reference to FIGS. 4 to 7.

[2-1] Configuration of Second Embodiment

Figure 4:
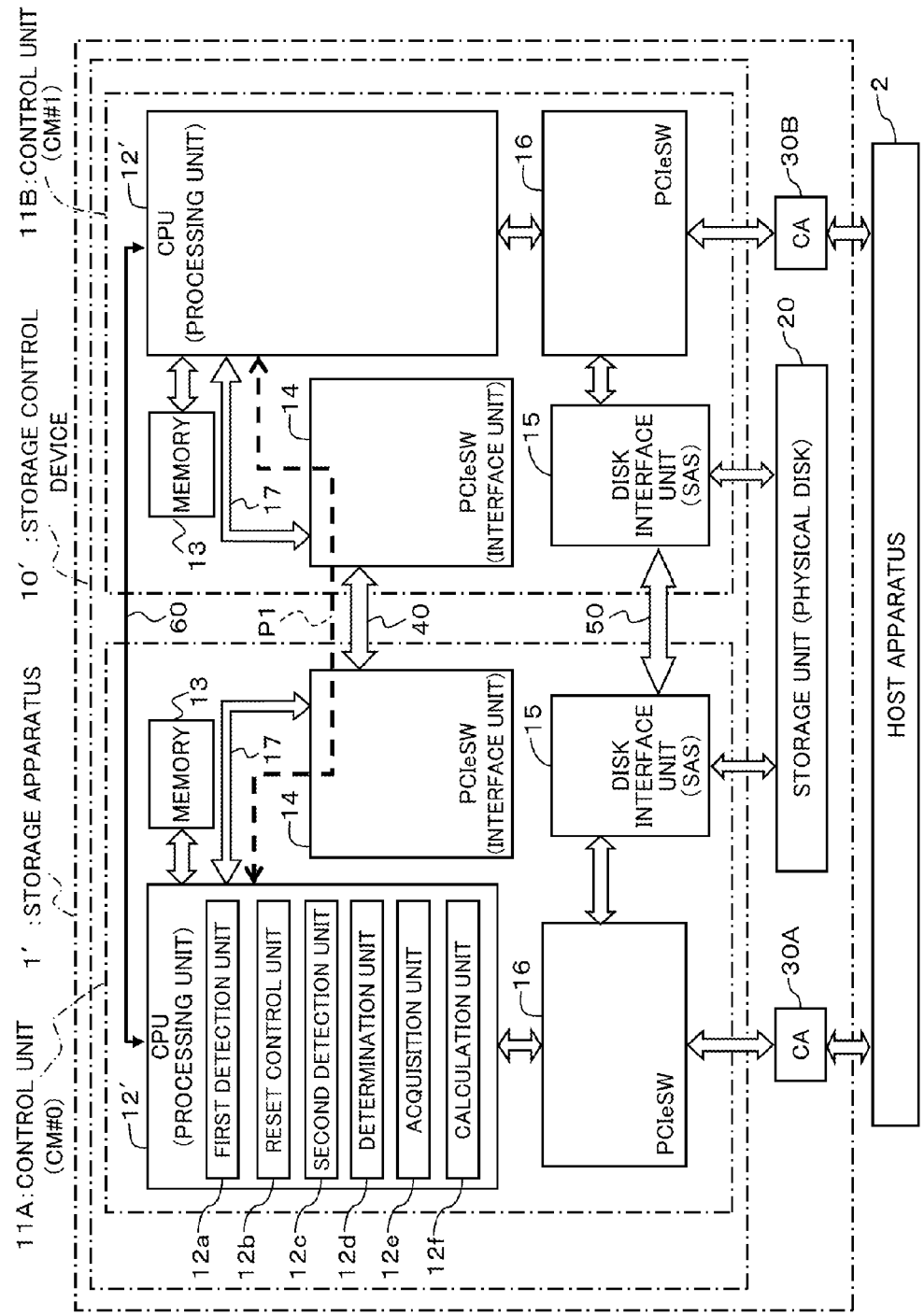
FIG. 4 is a block diagram that illustrates the hardware configuration and the functional configuration of a storage apparatus (RAID apparatus) including a storage control device as a second embodiment.

FIG. 4 is a block diagram that illustrates the hardware configuration and the functional configuration of a storage apparatus (RAID apparatus) 1' including a storage control device 10' as the second embodiment. In FIG. 4, the same reference sign denotes the same part or an approximately same part as that of the first embodiment, and thus, detailed description thereof will not be presented.

The storage apparatus 1' illustrated in FIG. 4 is configured almost similar to the storage apparatus 1 according to the first embodiment illustrated in FIG. 1. A difference between the storage apparatus 1 illustrated in FIG. 1 and the storage apparatus 1' illustrated in FIG. 4 is that the storage control device 10' is provided instead of the storage control device 10 in the storage apparatus 1'. In addition, a difference between the storage control device 10 illustrated in FIG. 1 and the storage control device 10' illustrated in FIG. 4 is that a CPU 12' is provided instead of the CPU 12 in each CM 11 of the storage control device 10'.

The CPU (processing unit) 12', similar to the CPU 12 of the first embodiment, is a processing unit that performs various control and calculation operations and is a multi-core processor (multiple CPUs). The CPU 12' executes an OS or a program that is stored in the memory 13 or the like, thereby realizing various functions.

Particularly, the CPU 12' of the second embodiment executes a predetermined storage control program, thereby, similar to the first embodiment, serving as a first detection unit 12a and a reset control unit 12b and additionally serving as a second detection unit 12c, a determination unit 12d, an acquisition unit 12e, and a calculation unit 12f to be described later. In FIG. 4, while functions denoted by reference signs 12a to 12f are illustrated only in the CPU 12' of the CM 11A, the functions are provided also in the CPU 12' of the CM 11B.

The second detection unit 12c detects a link abnormality of the CM 11A side on the inter-CM path P1, the link abnormality occurring in accordance with resetting of the PCIeSW described above. As described in the first embodiment, by performing PCIeSW reset by outputting a reset signal from the CPU 12' to the PCIeSW 14, the link abnormality occurs on the communication channel 17 between the CPU 12' and the PCIeSW 14. The link abnormality will be described later in detail with reference to FIG. 6.

The acquisition unit 12e acquires the communication amount per unit time (for example, one second) on the inter-CM path P1 at the time of a normal operation. The acquisition unit 12e acquires a maximum value (a maximum communication amount Cmax) of the communication amount per unit time on the inter-CM path P1 after the start of the operation of the CM 11A (11B) to which it belongs as the communication amount per unit time at the time of the normal operation. Here, the communication amount is a data size (bytes) transmitted for a predetermined time (for example, one second). The sequence of acquisition of the maximum communication amount Cmax that is performed by the acquisition unit 12e will be described later with reference to FIG. 5 (Steps S11 to S14).

In a case where a link abnormality is detected by the second detection unit 12c, the calculation unit 12f calculates the communication amount (theoretical value) C2 per unit time (for example, one second) that can be transmitted by hardware on the inter-CM path P1 in a state in which the link abnormality has occurred based on the status of the link abnormality. At this time, the theoretical value C2 is calculated in accordance with the PCIe protocol, for example, based on the communication status on the communication channel 17 in which the link abnormality has occurred such as a path width (the number of transmission lanes) and the transmission speed.

In a case where the link abnormality is detected by the second detection unit 12c, the determination unit 12d determines whether or not maintenance using the communication between CMs according to the inter-CM path P1 can be performed based on the status of the link abnormality. Particularly, by comparing the transmittable communication amount C2 in the state in which the link abnormality has occurred, which is calculated by the calculation unit 12f, and the maximum communication amount Cmax acquired by the acquisition unit 12e with each other, it is determined whether or not the maintenance using the communication between the CMs can be performed by the determination unit 12d.

Figure 5:
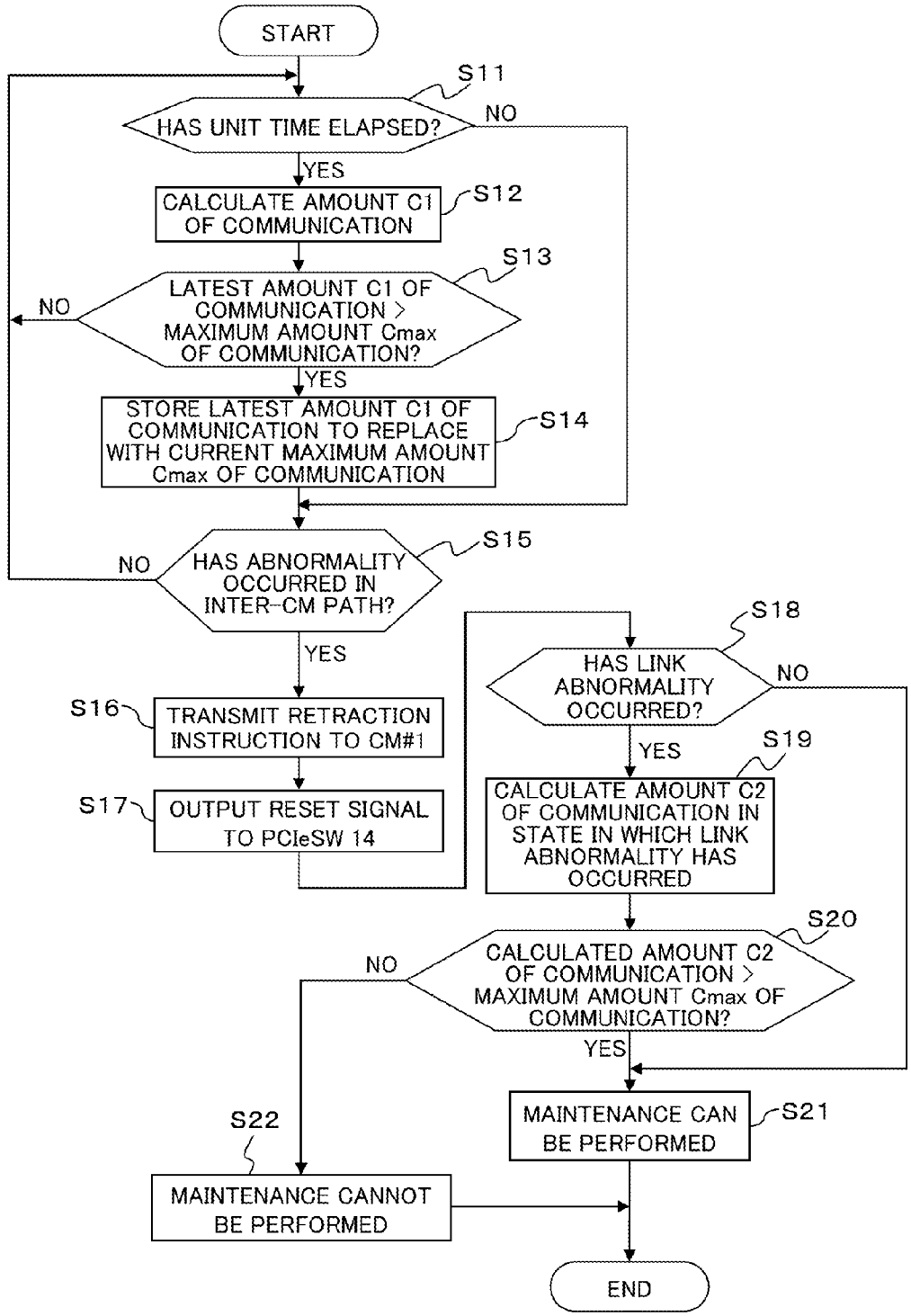
FIG. 5 is a flowchart that illustrates the operation of the storage control device illustrated FIG. 4.

More specifically, as will be described later with reference to FIGS. 5 and 7, in a case where the transmittable communication amount C2 exceeds the maximum communication amount Cmax (C2>Cmax), the determination unit 12d determines that the maintenance of the CM 11B to which it does not belong can be performed. In such a case, each CM 11 performs the maintenance of the CM 11B to which it does not belong by using the inter-CM path P1. On the other hand, in a case where the transmittable communication amount C2 is the maximum communication amount Cmax or less (C2≤Cmax), the determination unit 12d determines that the maintenance of the CM 11B to which it does not belong is not able to be performed.

[2-2] Operation of Second Embodiment

Next, the operation of the storage control device 10' illustrated in FIG. 4 will be described along a flowchart (Steps S11 to S22) illustrated in FIG. 5.

When the operation of the storage apparatus 1' is started, it is determined whether or not a unit time (for example, one second) has elapsed by the storage control device 10' in Step S11, and the occurrence of an abnormality on the inter-CM path P1 is monitored by the first detection unit 12a in Step S15. In a case where the unit time has not elapsed (No route of Step S11), the process of Step S15 is performed.

On the other hand, in a case where the unit time has elapsed (Yes route of Step S11), the acquisition unit 12e of each CM 11 calculates the size of data transmitted on the inter-CM path P1 within the latest unit time as a communication amount C1 in Step S12. Then, the acquisition unit 12e compares the calculated latest communication amount C1 and the maximum communication amount Cmax, which has been previously calculated, stored in the memory area of the memory 13 with each other in Step S13.

In a case where the latest communication amount C1 is the maximum communication amount or less (C1≤Cmax; No route of Step S13), the CPU 12' is returned to the process of Step S11. In a case where the latest communication amount C1 is larger than the maximum communication amount (C1>Cmax; Yes route of Step S13), the acquisition unit 12e rewrites the maximum communication amount Cmax until now, which is stored in the memory area of the memory 13, with the latest communication amount C1 in Step S14, and the process proceeds to the process of Step S15.

Until the occurrence of an abnormality on the inter-CM path P1 is detected by the first detection unit 12a in Step S15, the acquisition unit 12e repeats the process of Steps S11 to S14 (No route of Step S15). In this way, until the first detection unit 12a detects the occurrence of an abnormality on the inter-CM path P1 after the operation of the storage apparatus 1 is started, the acquisition unit 12e can acquire the maximum communication amount Cmax on the inter-CM path P1.

Meanwhile, the first detection unit 12a of the CM 11A (CM #0) monitors the occurrence of an abnormality on the inter-CM path P1 during the operation of the storage apparatus 1 in Step S15. In a case where the first detection unit 12a detects an abnormality on the inter-CM path P1 and specifies the other CM 11B (CM #1) as a suspicious CM (abnormal CM) having a higher possibility of the occurrence of the abnormality (Yes route of Step S15), the reset control unit 12b, similar to the first embodiment, operates as below.

A retraction instruction signal is transmitted from the CM #0 (CPU 12') to the CM #1 (CPU 12') through the I2C signal line 60 by the reset control unit 12b of the CM #0 in Step S16. In addition, a reset signal is transmitted from the CPU 12' to the PCIeSW 14 of the CM #0 through the communication channel 17 by the reset control unit 12b of the CM #0 in Step S17. Here, the process of Step S16 and the process of Step S17 may be performed in order that is opposite to the above-described order or may be performed simultaneously.

Thereafter, the second detection unit 12c of the CM #0 monitors the occurrence of a link abnormality on the inter-CM path P1 on the CM #0 side to which it belongs in accordance with resetting of the PCIeSW in Step S17 in Step S18. In a case where the second detection unit 12c of the CM #0 detects a link abnormality (Yes route of Step S18), a transmittable communication amount (theoretical value) C2 on the inter-CM path P1 in the state in which the link abnormality has occurred is calculated by the calculation unit 12f in Step S19.

Then, by comparing the transmittable communication amount C2 calculated by the calculation unit 12f and the maximum communication amount Cmax acquired by the acquisition unit 12e with each other, the determination unit 12d determines whether or not the maintenance using the communication between CMs can be performed in Step S20. In a case where the transmittable communication amount C2 exceeds the maximum communication amount Cmax (C2>Cmax; Yes route of Step S20), the determination unit 12d determines that the maintenance of the CM #1 to which it does not belong can be performed in Step S21. In addition, in a case where a link abnormality has not been detected by the second detection unit 12c of the CM #0 (No route of Step S18), the determination unit 12d determines that the maintenance of the CM #1 to which it does not belong can be performed in Step S21. As above, in a case where it is determined that the maintenance using the communication between CMs can be performed, as will be described later with reference to FIG. 7, each CM 11 performs the maintenance of each CM 11 using the inter-CM path P1.

On the other hand, in a case where the transmittable communication amount C2 is the maximum communication amount Cmax or less (C2≤Cmax; No route of Step S20), the determination unit 12d determines that the maintenance of the CM #1 to which it does not belong is not able to be performed in Step S22. In such a case, the power of the storage apparatus 1 is turned off, and the maintenance of the CM #0 is performed, or maintenance according to a technique of a third embodiment to be described later is performed. In a case where the maintenance according to the technique of the third embodiment is performed, the process proceeds from the No route of Step S20 illustrated in FIG. 5 to the process of Step S23 and subsequent steps illustrated in FIG. 9.

Figure 6:
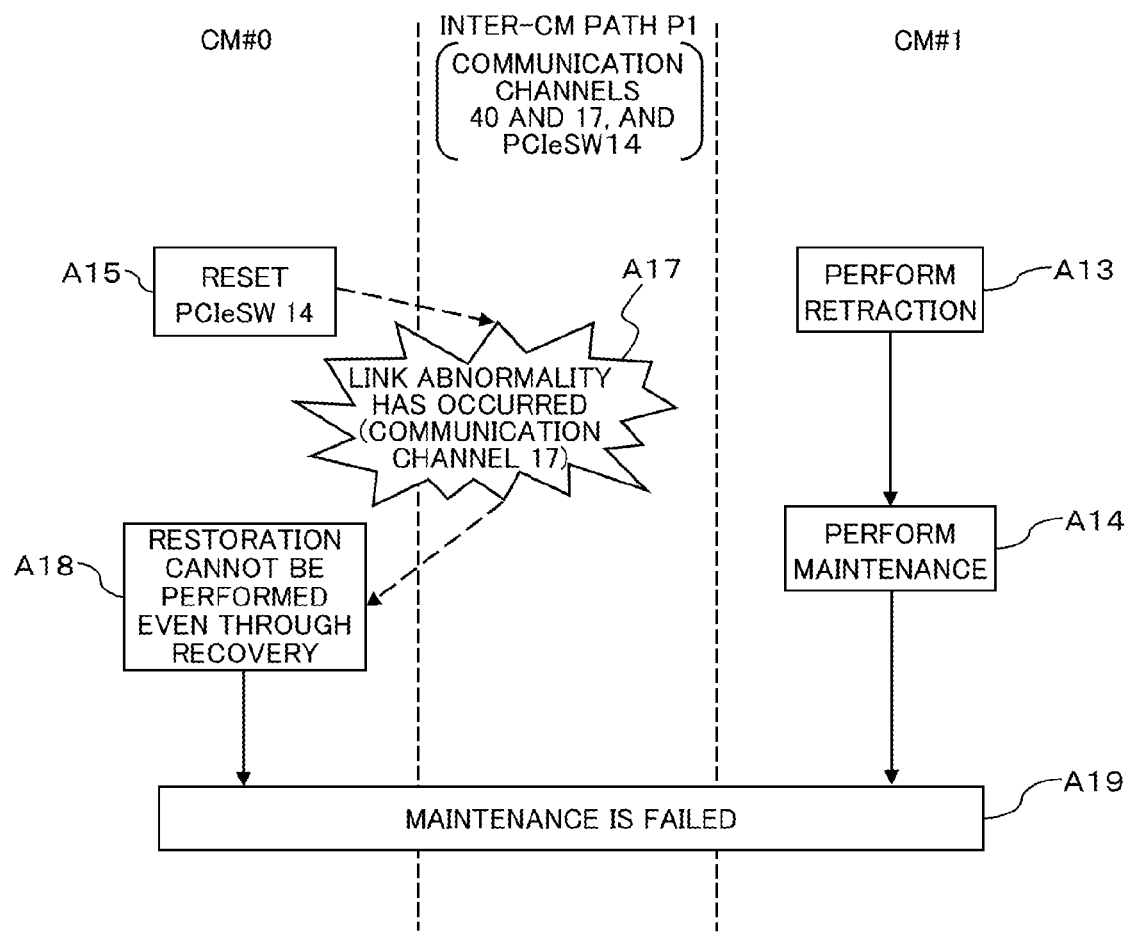
FIG. 6 is a sequence diagram that illustrates an operation (an example of unsuccessful maintenance) of a case where a link abnormality accompanied with a resetting operation occurs in the storage control device.

Here, a link abnormality occurring in accordance with the resetting of the PCIeSW and the reason for not being able to perform the maintenance of the suspicious CM according to the link abnormality will be described with reference to FIG. 6 (reference signs A13 to A15 and A17 to A19). FIG. 6 is a sequence diagram that illustrates an operation (an example of unsuccessful maintenance) of a case where a link abnormality accompanied with a resetting operation occurs in the storage control device. In FIG. 6, reference signs A13 to A15 respectively correspond to reference signs A13 to A15 illustrated in FIG. 3.

In the first embodiment described above, when an abnormality of the inter-CM path P1 is detected on the CM #0 side, the CM #1 is retracted (see reference sign A13), the maintenance of the suspicious CM #1 is performed (see reference sign A14), and the PCIeSW 14 of the CM #0 is reset in accordance with a reset signal transmitted from the CPU 12' (see reference sign A15). At this time, by resetting the PCIeSW, the abnormality of the PCIeSW 14 can be resolved with a considerable probability.

However, when the PCIeSW is reset, the communication channel 17 between the CPU 12' and the PCIeSW 14 is once disconnected (link down) and then is reconnected (link up), and accordingly, there are cases where a link abnormality occurs on the communication channel 17 that is included in the inter-CM path P1. When stable communication is performed between the CPU 12' and the PCIeSW 14 in an expected state (a path width and a transmission speed that are desirable) that is desirable, the link abnormality occurs by being triggered upon disconnection/connection of the communication. While the communication channel 17 in which a link abnormality has occurred is not in a state in which communication is not able to be performed at all, the path width and the transmission speed are in a state of being degraded from the path width and the transmission speed that are desirable (the capacity degradation of the inter-CM path P1).

In the communication channel 17 between the CPU 12' and the PCIeSW 14, the PCIe is used. According to the specification of the PCIe, in a case where the link state of the communication channel is not an expected state (the path width and the transmission speed that are desirable), in other words, for example, in the capacity-degraded state as described above, communication using the communication channel of which the capacity is degraded is not allowed. The reason for this is that there is a possibility of the occurrence of a response delay, time-out, and the like due to the capacity degradation of the inter-CM path P1 according to the link abnormality.

According to such a specification, when a link abnormality occurs on the communication channel 17 between the CPU 12' and the PCIeSW 14 (see reference sign A17) in accordance with the resetting of the PCIeSW (see reference signal A15), communication using the communication channel 17 is not allowed. Accordingly, even when the CM #1 after the maintenance is inserted into the storage apparatus 1 (see reference sign A14), data transmission (communication between CMs) from the CM #0 to the CM #1 is not performed, and the CM #1 is not able to be recovered by performing data recovery of the CM #1 (see reference signal A18). Accordingly, the maintenance of the suspicious CM #1 is not able to be performed, and the maintenance of the suspicious CM#1 fails (see reference sign A19). When the maintenance fails, the operation of the storage apparatus needs to be stopped, so that the maintenance/replacement of the CM #0 can be performed without completing the maintenance of the suspicious CM#1.

As described above, when a link abnormality occurs in accordance with the resetting of the PCIeSW, due to the specification of the PCIe (due to a concern from the viewpoint of the capacity), the maintenance is not able to be performed. However, even in a case where the inter-CM path P1 (particularly, the communication channel 17) is in an abnormal link state, communication using the communication channel 17 can be performed unless the inter-CM path P1 is in the link down state. However, when the communication using the communication channel 17 that is in an abnormal link state is performed, due to capacity degradation (capacity bottleneck) according to the abnormal link, there is a concern that there is an influence on the capacity such as a response delay or time-out. Accordingly, in a case where it is known to secure a communication amount of a level for which there is no influence on the capacity in the inter-CM path P1 (communication channel 17), data can be transmitted using the inter-CM path P1 (communication channel 17) without any problem, and it can be determined that the maintenance can be performed (maintainability).

Thus, in the second embodiment, after the operation of the storage apparatus 1' is started, the maximum communication amount Cmax during the normal operation in the inter-CM path P1 is acquired by the acquisition unit 12e. When a link abnormality occurs, a communication amount C2 that can be transmitted by the hardware in the inter-CM path P1 in the state in which a link abnormality has occurred is calculated based on the path width, the transmission speed, and the like of the communication channel 17 in which the link abnormality has occurred in accordance with the PCIe protocol by the calculation unit 12f. Until a link abnormality occurs after the start of the operation of the storage apparatus 1', the maximum communication amount Cmax acquired by the acquisition unit 12e can be regarded as a maximum communication amount of the communication performed through the inter-CM path P1 thereafter.

Accordingly, in a case where C2>Cmax, the communication amount of a level for which there is no influence on the capacity can be secured in the inter-CM path P1, and accordingly, the link abnormality does not cause a bottleneck of the capacity, and the determination unit 12d can determine that the maintenance of the suspicious CM #1 can be performed. On the other hand, in a case where C2 Cmax, a communication amount of a level for which there is no influence on the capacity is not secured in the inter-CM path P1, and there is a possibility that the link abnormality causes a bottleneck of the capacity, whereby it can be determined that the maintenance of the suspicious CM #1 is not able to be performed.

Here, a maintenance operation according to the second embodiment will be described with reference to Steps S11 to S22 illustrated in FIG. 5 and reference signs A20 to A33 illustrated in FIG. 7. Particularly, here, a maintenance operation will be described in a case where, after a maximum communication amount during a normal operation is acquired, at the time of detecting an abnormality on the inter-CM path P1, a normal CM #1 is erroneously specified as a suspicious CM, the PCIeSW is reset, and a link abnormality accompanied with the reset operation occurs. FIG. 7 is a sequence diagram that illustrates a maximum communication amount acquiring operation of the storage control device 10' illustrated in FIG. 4 and an operation (an example of successful maintenance) of a case where a link abnormality accompanied with a resetting operation in the storage control device 10' illustrated in FIG. 4 occurs.

When the operation of the storage apparatus 1' is started, the acquisition unit 12e of each of the CMs #0 and #1 acquires a communication amount C1 per unit time at the time of a normal operation in the inter-CM path P1. Then, the acquisition unit 12e acquires a maximum value Cmax of the communication amount C1 after the start of the operation as the communication amount per unit time at the time of the normal operation and stores the maximum value (see reference signs A20 to A22; Steps S11 to S14).

When an abnormality (see reference sign A23) of the inter-CM path P1 that occurs on the CM #0 side is detected (see reference sign A24; Yes route of Step S15) with the CM #1 being as a suspicious CM, a retraction instruction signal is transmitted from the CM #0 to the CM #1 (see Step S16). When the retraction instruction signal is received by the CM #1, the CM #1 is retracted (stopped) and is cut off from the storage apparatus 1' (see reference sign A25), then, the maintenance of the suspicious CM #1 is performed, and the CM #1 after the maintenance is inserted into the storage apparatus 1' (see reference sign A26).

Meanwhile, in the survived CM #0, the PCIeSW 14 in which the abnormality remains is reset in accordance with a reset signal transmitted from the CPU 12' of the CM #0 to which it belongs (see reference sign A27; Step S17). About 90% of abnormalities occurring in the PCIeSW 14 are abnormalities (an intermittent fault, a software error, and the like) that can be resolved by the resetting operation. Accordingly, by resetting the PCIeSW as described above, about 90% of abnormalities remaining in the PCIeSW 14 are resolved.

Thereafter, when a link abnormality occurs on the communication channel 17 of the CM #0 side on the inter-CM path P1 in accordance with the resetting of the PCIeSW (see reference sign A28), the link abnormality is detected by the second detection unit 12c of the CM#0 (see reference sign A29; Yes route of Step S18). When the link abnormality is detected, the maximum communication amount Cmax and the transmittable communication amount C2 are acquired, as described above, the maximum communication amount Cmax and the transmittable communication amount C2 are compared with each other by the determination unit 12d, and it is determined whether or not the maintenance using the inter-CM path P1 can be performed (see reference sign A30; Steps S19 and S20).

In a case where it is determined that the maintenance using the inter-CM path P1 can be performed by the determination unit 12d (see reference sign A31; see Step S21), the maintenance of each CM 11 using the inter-CM path P1 is performed by each CM 11. In other words, in accordance with data transmission (communication between CMs) from the CM #0 to the CM #1 after the maintenance, data recovery of the CM #1 is performed, whereby the CM #1 is recovered. In this way, when the maintenance of the suspicious CM #1 is successful (see reference sign A32), the storage control device 10' is returned to a normal operation according to the CM #0 and the CM #1.

On the other hand, in a case where it is determined that the maintenance using the inter-CM path P1 is not able to be performed by the determination unit 12d (see reference sign A33; Step S22), a communication amount of a level for which there is no influence on the capacity is not secured in the inter-CM path P1, and there is a possibility that the link abnormality causes a bottleneck of the capacity. Accordingly, the power of the storage apparatus 1' is turned off, and the maintenance of the CM #0 is performed, or maintenance according to a technique of the third embodiment to be described later is performed. In a case where the maintenance according to the technique of the third embodiment is performed, the process proceeds from a step denoted by reference sign A33 illustrated in FIG. 7 to a step denoted by reference sign A51 illustrated in FIG. 11.

[2-3] Advantage of Second Embodiment

According to the storage control device 10' and the storage apparatus 1' of the second embodiment, operations and advantages that are similar to those of the storage control device 10 and the storage apparatus 1 of the first embodiment can be acquired.

Particularly, according to the storage control device 10' and the storage apparatus 1' of the second embodiment, even when a link abnormality occurs in accordance with the PCIeSW resetting, in a case where a communication amount of a level for which there is no influence on the capacity can be secured in the inter-CM path P1, maintenance using the inter-CM path P1 is performed. In this way, even in a case where a link abnormality occurs in accordance with the PCIeSW resetting, the maintenance of the suspicious CM can be performed with the operation of the storage apparatus 1 being continued. In addition, since the number of cases where the maintenance can be performed without stopping the operation of the storage apparatus 1' increases, the maintenance technique is improved, whereby a possibility that the operation of the storage apparatus 1' is stopped can be further lowered.

[3] Third Embodiment

Next, a third embodiment will be described with reference to FIGS. 8 to 11.

[3-1] Configuration of Third Embodiment

Figure 8:
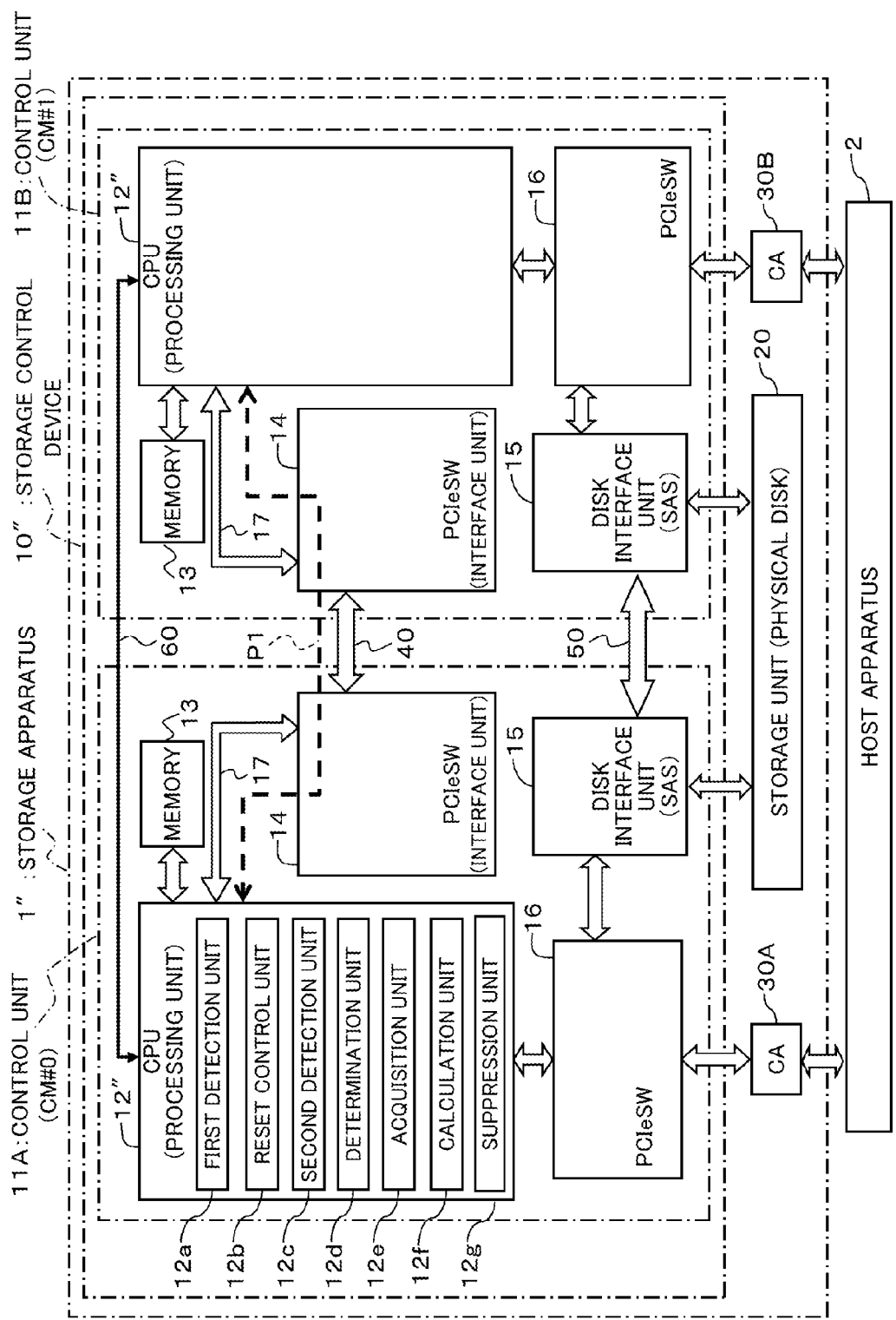
FIG. 8 is a block diagram that illustrates the hardware configuration and the functional configuration of a storage apparatus (RAID apparatus) including a storage control device as a third embodiment.

FIG. 8 is a block diagram that illustrates the hardware configuration and the functional configuration of a storage apparatus (RAID apparatus) 1" including a storage control device 10" as a third embodiment. In FIG. 8, the same reference sign denotes the same part or an approximately same part as that of the first embodiment, and thus, detailed description thereof will not be presented.

The storage apparatus 1" illustrated in FIG. 8 is configured similar to the storage apparatus 1' according to the second embodiment illustrated in FIG. 4. A difference between the storage apparatus 1' illustrated in FIG. 4 and the storage apparatus 1" illustrated in FIG. 8 is that the storage control device 10" is provided instead of the storage control device 10' in the storage apparatus 1". In addition, a difference between the storage control device 10' illustrated in FIG. 4 and the storage control device 10" illustrated in FIG. 8 is that a CPU 12" is provided instead of the CPU 12' in each CM 11 of the storage control device 10".

The CPU (processing unit) 12", similar to the CPU 12' of the second embodiment, is a processing unit that performs various control and calculation operations and is a multi-core processor (multiple CPUs). The CPU 12" executes an OS or a program that is stored in the memory 13 or the like, thereby realizing various functions.

Particularly, the CPU 12" of the third embodiment executes a predetermined storage control program, thereby, similar to the second embodiment, achieving the functions represented by reference signs 12a to 12f and serving as a suppression unit 12g to be described later. In FIG. 8, while functions denoted by reference signs 12a to 12g are illustrated only in the CPU 12" of the CM 11A, the functions are provided also in the CPU 12" of the CM 11B.

In a case where it is determined that the maintenance using the inter-CM path P1 is not able to be performed by the determination unit 12d, the suppression unit 12g suppresses the communication between CMs using the inter-CM path P1. At this time, the suppression unit 12g moves information used for receiving all the I/O requests issued by the host apparatus 2 from the CM #0 to which it belongs to the CM #1 to which it does not belong, thereby suppressing the communication between CMs using the inter-CM path P1. Here, the information is stored in the memory 13 (data area) of the CM #0. In addition, the information, for example, includes both first logical unit information (first LUN) specifying a logical unit that is the management target according to the CM #0 and second logical unit information (second LUN) specifying a logical unit that is the management target according to the CM #1.

[3-2] Operation of Third Embodiment

Figure 9:
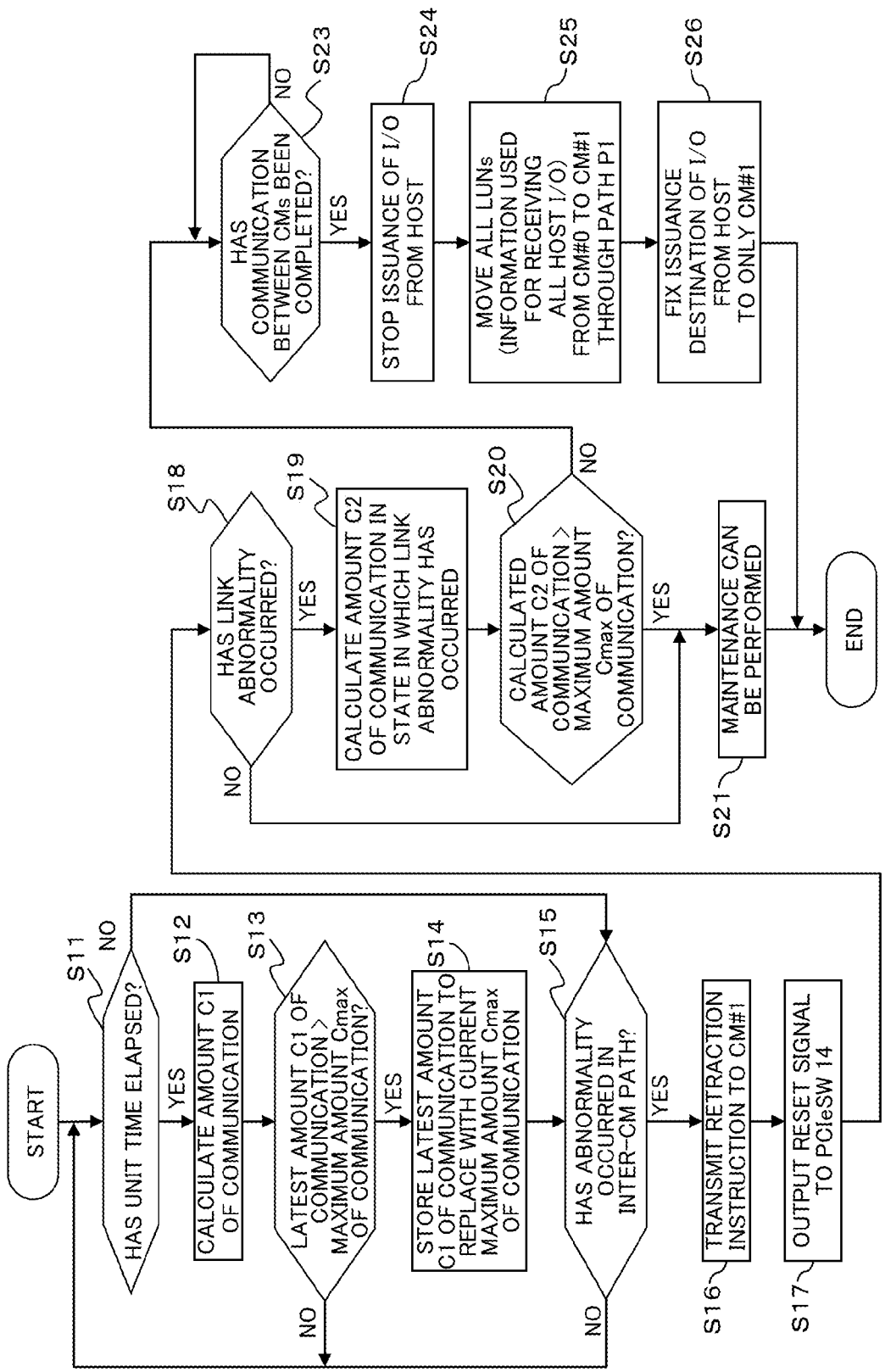
FIG. 9 is a flowchart that illustrates the operation of the storage control device illustrated in FIG. 8.

Next, the operation of the storage control device 10" illustrated in FIG. 8 will be described along a flowchart (Steps S11 to S21 and S23 to S26) illustrated in FIG. 9. The process of Steps S11 to S21 illustrated in FIG. 9 is similar to the process of Steps S11 to S21 illustrated in FIG. 5, and thus, description thereof will not be presented. Here, the process of Step S23 and subsequent steps illustrated in FIG. 9 from the No route of Step S20 will be described.

In a case where the transmittable communication amount C2 is determined to be equal to or less than the maximum communication amount Cmax by the determination unit 12d (C2≤Cmax; No route of Step S20), a communication amount of a level for which there is no influence on the capacity is not secured in the inter-CM path P1, and there is a possibility that a link abnormality causes a bottleneck of the capacity. In this case, the CM #0 waits for performing the maintenance of the suspicious CM #1, inserting the CM #1 after the maintenance into the storage apparatus 1", and completing the communication between CMs (No route of Step S23).

When the communication between CMs is completed (Yes route of Step S23), the CM #0 temporarily stops the issuance of an I/O request from the host apparatus 2 in Step S24. Then, the suppression unit 12g of the CM #0 moves the information (all the LUNs described above) used for receiving all the I/O requests issued by the host apparatus 2 from the CM #0 to which it belongs to the CM #1 to which it does not belong in Step S25.

Thereafter, the CM #0 fixes the issuance destination of the I/O request transmitted from the host apparatus 2 only to the CM #1 in Step S26. In this way, all the I/O requests from the host apparatus 2 are directly issued to the CM #1. Accordingly, I/O requests from the host apparatus 2 are not transmitted from the CM #0 to the CM #0 through the inter-CM path P1, whereby the communication between CMs is suppressed.

In the above-described second embodiment, when a link abnormality occurs in accordance with the PCIeSW resetting, in a case where a link abnormality does not cause a bottleneck of the capacity, the maintenance can be performed without stopping the storage apparatus 1. However, when a link abnormality occurs in accordance with the PCIeSW resetting, still, the link abnormality causes a bottleneck of the capacity, and there are cases where the maintenance is not able to be performed.

The reason for the link abnormality being a bottleneck of the capacity and not being able to perform maintenance is that the process of I/O requests transmitted from the host apparatus 2, which requires a large amount of data, is performed using the communication between CMs. Accordingly, in a case where a bottleneck of the capacity occurs in accordance with a link abnormality, by performing the process of I/O requests transmitted from the host apparatus 2 without performing the communication between CMs, such a case in which the link abnormality causes a bottleneck of the capacity, and the maintenance is not able to be performed, is resolved.

Figure 10:
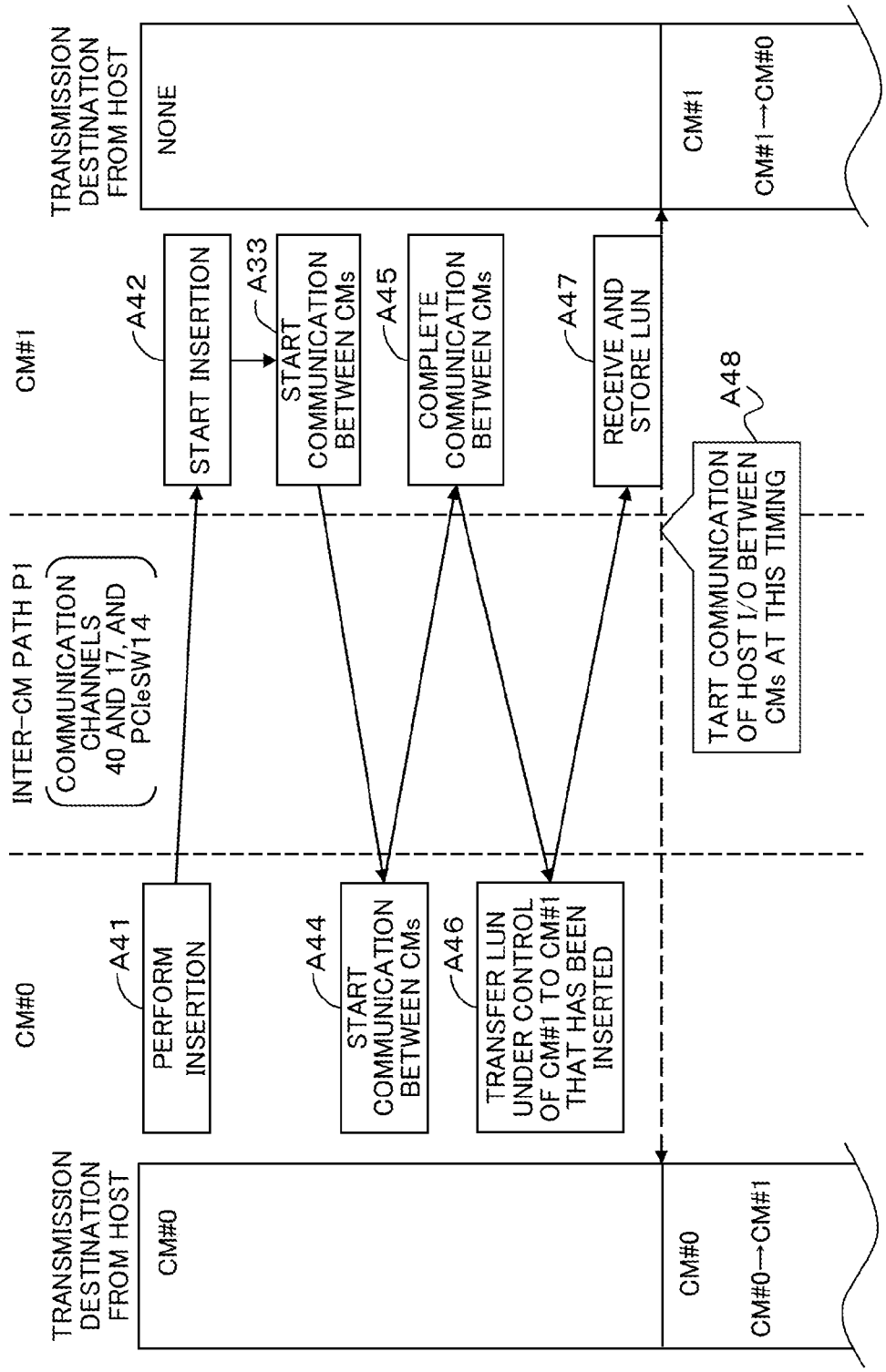
FIG. 10 is a sequence diagram that illustrates an operation of a case where a link abnormality accompanied with a resetting operation in the storage control device causes a bottleneck of the capacity, and the maintenance is not able to be performed.

Here, an operation of a case where a link abnormality accompanied with a resetting operation causes a bottleneck of the capacity, and the maintenance is not able to be performed in the storage control device will be described with reference to FIG. 10 (reference signs A41 to A48). FIG. 10 is a sequence diagram that illustrates the operation. FIG. 10 illustrates the operations of the CM #0 and the CM #1 after performing steps denoted by reference signs A26 and A33 illustrated in FIG. 7.

In a case where it is determined that the maintenance is not able to be performed in the second embodiment (see reference sign A33 illustrated in FIG. 7), after the maintenance of the suspicious CM #1 is performed (see reference sign A26 illustrated in FIG. 7), an insertion instruction from the CM #0 to the CM #1 is made (see reference sign A41). When the insertion instruction is received, the insertion of the CM #1 is started (see reference sign A42), and the communication between the CMs is performed (see reference signs A43 and A44).

According to the present specification, when the communication between the CMs is completed (see reference sign A45), an LUN (second LUN) that is maintained in the CM #0 under the management of the CM #1 is transmitted and transferred from the CM #0 to the inserted CM #1 (see reference sign A46). In addition, the second LUN is transmitted and transferred from the CM #1 to the CM #0 immediately prior to the retraction of the CM #1. Accordingly, until a process denoted by reference sign A46 is performed from prior to the retraction of the CM #1, in the CM #0, both the LUN (first LUN) that is under the management of the CM #0 and the second LUN are maintained. In this way, during this period, the CM #0 continues to independently operate the storage apparatus 1 without performing the communication between the CMs.

When the second LUN is received and stored in the CM #1 (see reference sign A47), a state is formed in which the first LUN is stored in the CM #0, and the second LUN is stored in the CM #1. Accordingly, at a time point when the second LUN is stored in the CM #1, communication between the CMs for an I/O request (host I/O) is started (see reference sign A48).

Thus, according to the third embodiment, in a case where a bottleneck of the capacity occurs in accordance with a link abnormality, in order to perform the process of the I/O request transmitted from the host apparatus 2 without performing the communication between the CMs, immediately after the completion of the communication between the CMs, all the LUNs (both the first LUN and the second LUN) of the CM #0 are moved from the CM #0 to the CM #1.

Figure 11:
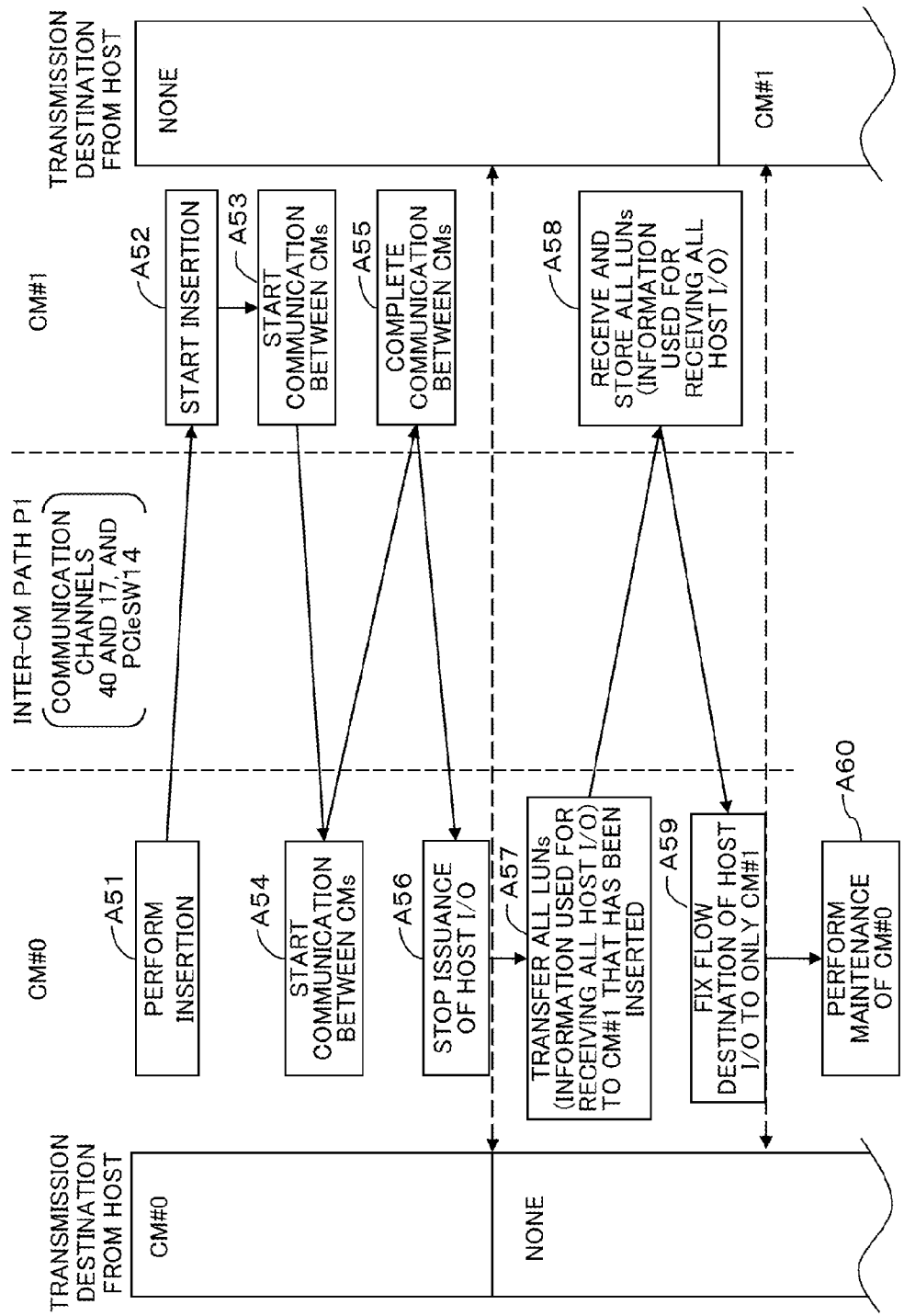
FIG. 11 is a sequence diagram that illustrates an operation (an example of successful maintenance) of a case where a link abnormality accompanied with a resetting operation causes a bottleneck of the capacity in the storage control device illustrated in FIG. 8.

Hereinafter, a maintenance operation according to the third embodiment will be described with reference to Steps S20 and S23 to S26 illustrated in FIG. 9 and reference signs A51 to A60 illustrated in FIG. 11. Here, the operations denoted by reference signs A51 to A55 illustrated in FIG. 11 are similar to the operations denoted by reference signs A41 to A45 illustrated in FIG. 10, and thus, the description thereof will not be presented. FIG. 11 is a sequence diagram that illustrates an operation (an example of successful maintenance) of a case where a link abnormality accompanied with a resetting operation causes a bottleneck of the capacity in the storage control device 10″ illustrated in FIG. 8.

Figure 7:
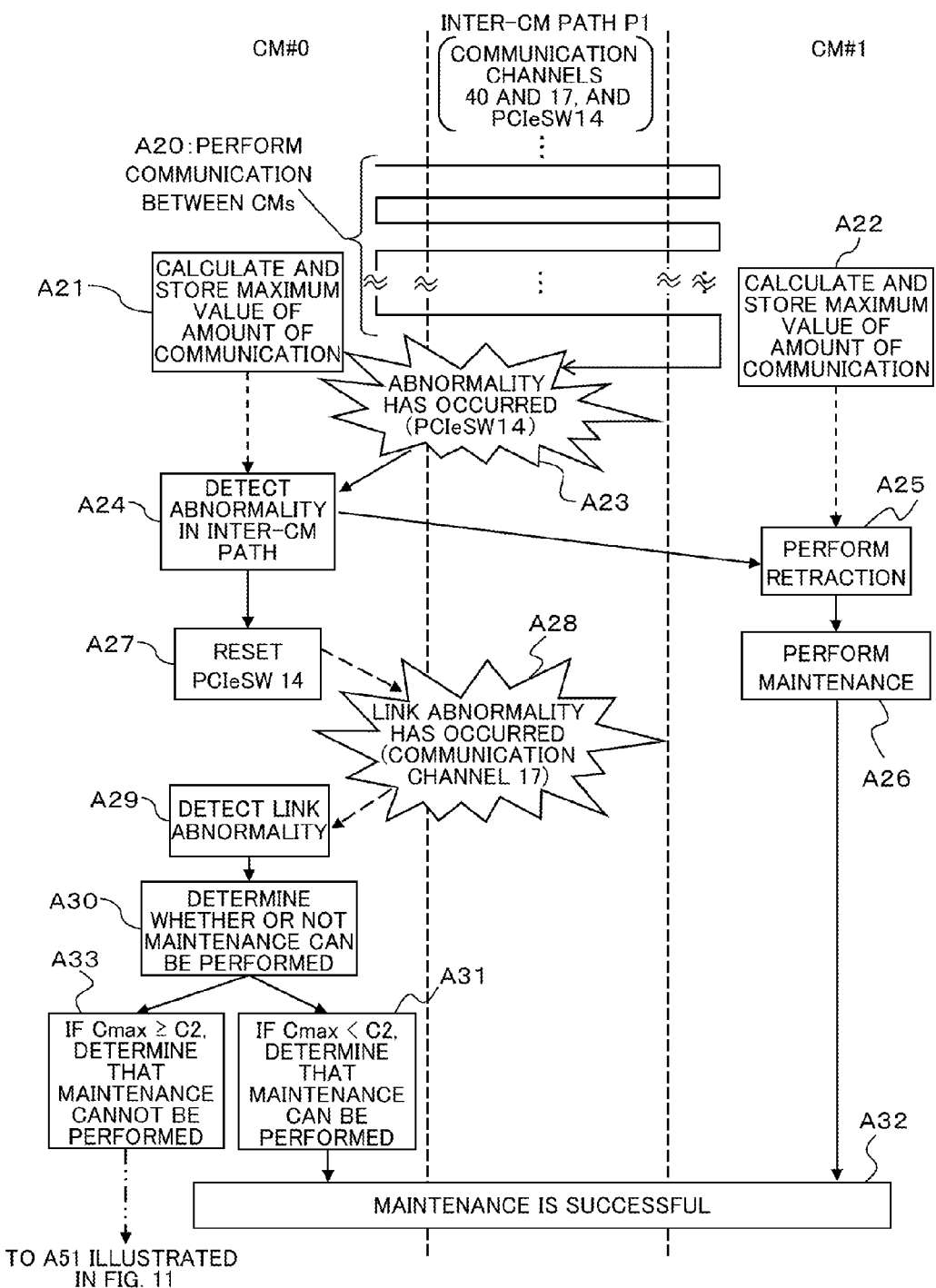
FIG. 7 is a sequence diagram that illustrates a maximum communication amount acquiring operation of the storage control device illustrated in FIG. 4 and an operation (an example of successful maintenance) of a case where a link abnormality accompanied with a resetting operation in the storage control device illustrated in FIG. 4 occurs.

In a case where it is determined that the maintenance is not able to be performed (see reference sign A33 illustrated in FIG. 7; No route of Step S20), the CM #0 waits for the completion of the communication between the CMs (see No route of Step S23). When the communication between the CMs is completed for the CM #1 after the maintenance (see reference signs A51 to A55; Yes route of Step S23), the CM #0 temporarily stops the issuance of an I/O request from the host apparatus 2 (see reference sign A56; Step S24).

Then, the suppression unit 12g of the CM #0 moves and transfers the information (in other words, both the first LUN and the second LUN) used for receiving all the I/O requests issued by the host apparatus 2 from the CM #0 to which it belongs to the CM #1 to which it does not belong (see reference sign A57). At this time, the above-described information, as described above, is transmitted from the CM #0 to the CM #1 by using the inter-CM path P1 in which a link abnormality or the like occurs. Since the data amount of the above-described information is small, even when a link abnormality or the like occurs in the inter-CM path P1, the above-described information can be transmitted from the CM #0 to the CM #1 without influencing the capacity unless link-down occurs.

Thereafter, when the above-described information is received and stored in the CM #1 (see reference sign A58), the CM #0 fixes the issuance destination of I/O requests from the host apparatus 2 only to the CM #1 (see reference sign A59; Step S26). In this way, all the I/O requests from the host apparatus 2 are directly issued to the CM #1.

Accordingly, I/O requests from the host apparatus 2 are not transmitted from the CM #0 to the CM #1 through the inter-CM path P1, whereby the communication between CMs is suppressed. In this way, in the state in which the communication between the CMs is suppressed, data recovery from the host apparatus 2 to the CM #1 after the maintenance is performed, whereby the CM #1 is recovered. In addition, in the state in which the communication between the CMs is suppressed, the CM #0 can be retracted and be cut off from the storage apparatus 1", and accordingly, the maintenance of the CM #0 in which an abnormality originally occurs can be performed (see reference sign A60).

Furthermore, when the maintenance of both the CM #0 and CM #1 is completed, the fixation of the issuance destination of I/O requests transmitted from the host apparatus 2 to the CM #1 is released, and the first LUN specifying the logical unit that is the management target of the CM #0 is moved from the CM #1 to the CM #0. Accordingly, the storage control device 10" is returned to the normal operation according to the CM #0 and the CM #1.

[3-3] Advantage of Third Embodiment

According to the storage control device 10" and the storage apparatus 1" of the third embodiment, operations and advantages that are similar to those of the storage control device 10 and the storage apparatus 1 of the first embodiment and those of the storage control device 10' and the storage apparatus 1' of the second embodiment can be acquired.

Particularly, according to the storage control device 10" and the storage apparatus 1" of the third embodiment, in a case where a bottleneck of the capacity occurs in accordance with a link abnormality, the process of an I/O request from the host apparatus 2 can be performed without performing the communication between the CMs. Accordingly, as described above, a case is resolved in which a link abnormality causes a bottleneck of the capacity, and the maintenance is not able to be performed is resolved. Accordingly, the maintenance technique is improved, and a possibility that the operation of the storage apparatus 1" is stopped can be further lowered.

[4] Modified Example of Third Embodiment

Next, a modified example of the third embodiment will be described with reference to FIGS. 12 and 13.

[4-1] Configuration of Modified Example of Third Embodiment

Figure 12:
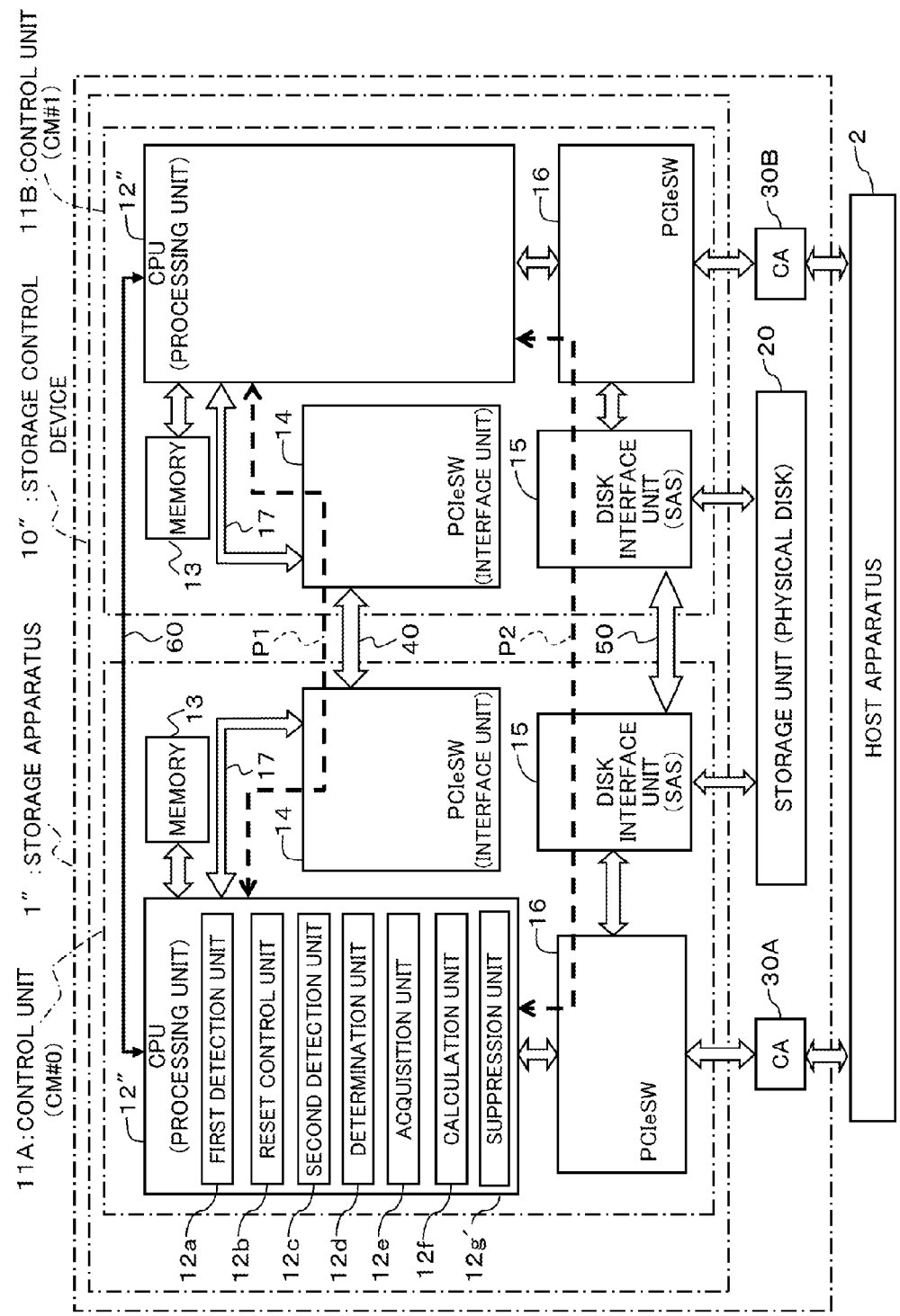
FIG. 12 is a block diagram that illustrates the hardware configuration and the functional configuration of a storage apparatus (RAID apparatus) including a modified example of the storage control device as the third embodiment.
Figure 13:
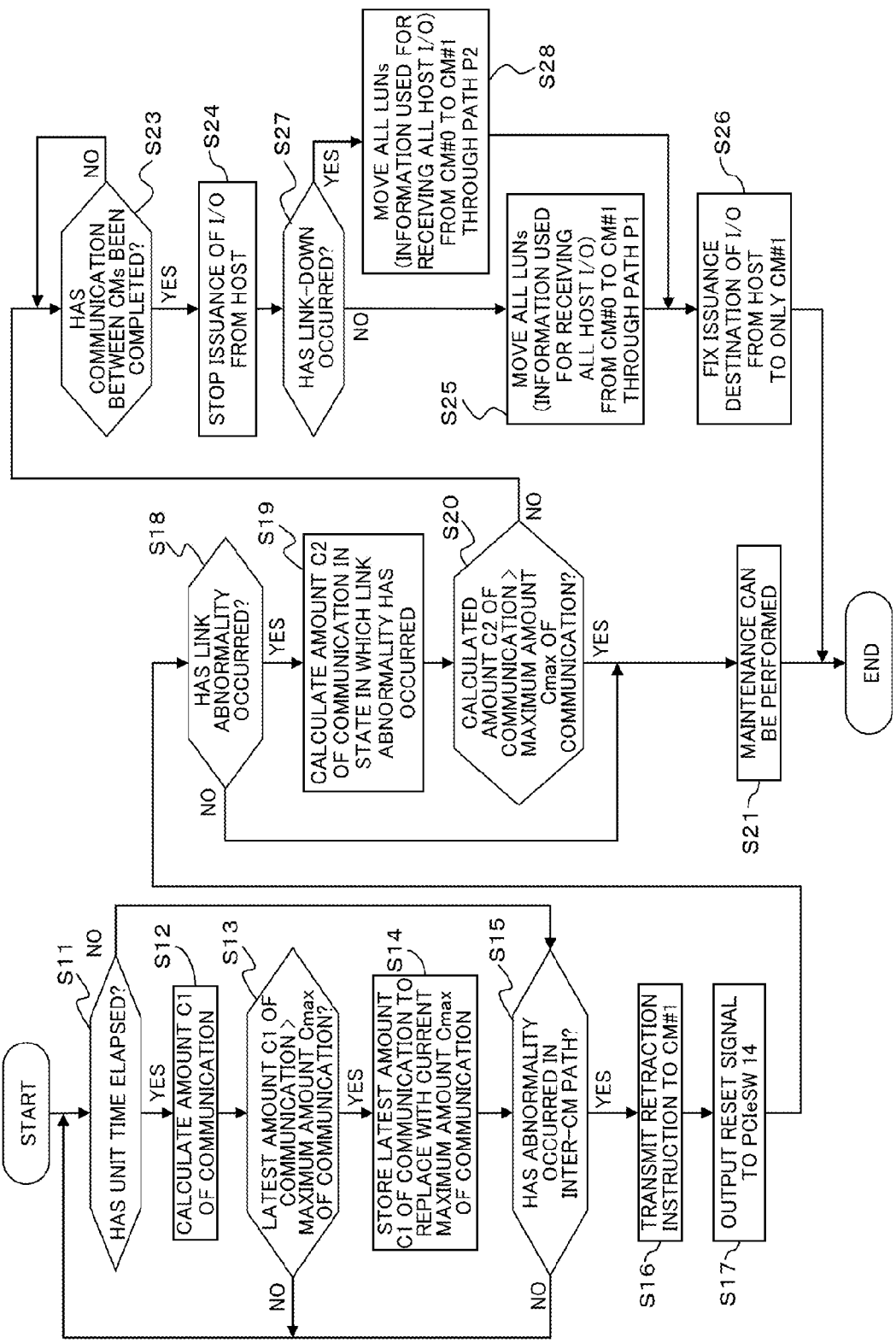
FIG. 13 is a flowchart that illustrates the operation of the storage control device illustrated in FIG. 12.
Figure 14:
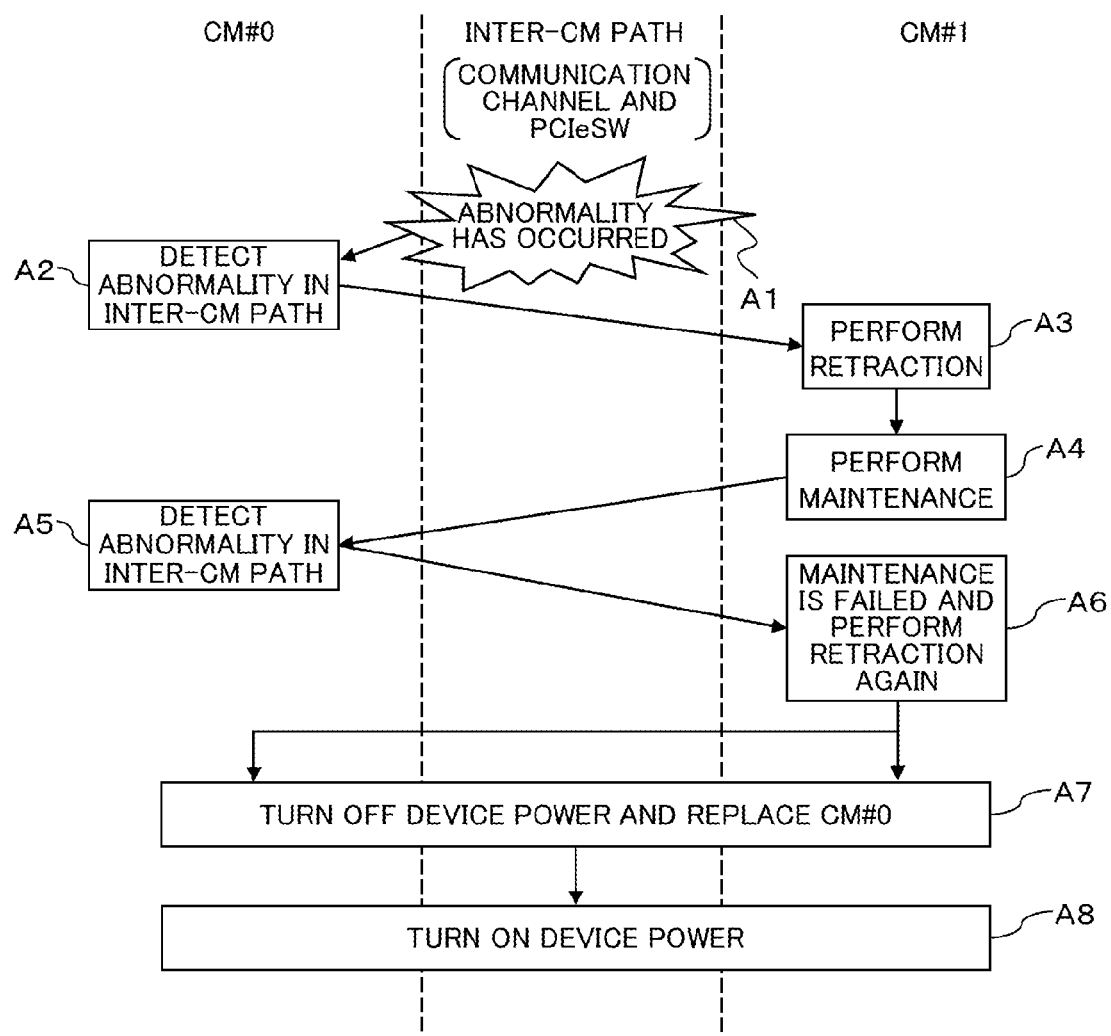
FIG. 14 is a sequence diagram that illustrates an operation of a case where a normal CM is erroneously specified as a suspicious CM in the storage control device.

FIG. 12 is a block diagram that illustrates the hardware configuration and the functional configuration of a storage apparatus (RAID apparatus) 1" including a modified example of the storage control device 10" as the third embodiment. In FIG. 12, the same reference numeral denotes the same portion or an approximately same portion, and thus, detailed description thereof will not be presented.

The storage apparatus 1" illustrated in FIG. 12 is configured similar to the storage apparatus 1" according to the third embodiment illustrated in FIG. 8. A difference between the storage apparatus 1" illustrated in FIG. 8 and the storage apparatus 1" illustrated in FIG. 12 is that a suppression unit 12g' is provided instead of the suppression unit 12g. The CPU 12" of the modified example of the third embodiment, executes a predetermined storage control program, thereby, similar to the third embodiment, achieving the functions represented by reference signs 12a to 12f and serving as the suppression unit 12g to be described later. In FIG. 12, while functions denoted by reference signs 12a to 12f and 12g' are illustrated only in the CPU 12" of the CM 11A, the functions are provided also in the CPU 12" of the CM 11B.

In a case where it is determined that the maintenance using the inter-CM path P1 is not able to be performed by the determination unit 12d, the suppression unit 12g', similar to the suppression unit 12g of the third embodiment, sup-presses the communication between CMs using the inter-CM path P1. At this time, the suppression unit 12g' moves information (both the first LUN and the second LUN) used for receiving all the I/O requests issued by the host apparatus 2 from the CM #0 to which it belongs to the CM #1 to which it does not belong, thereby suppressing the communication between CMs using the inter-CM path P1.

Particularly, in a case where the inter-CM path P1 is in a state in which a link abnormality has occurred, but in a link-up state, the suppression unit 12g' moves the above-described information from the CM #0 to which it belongs to the CM #1 to being it does not belong through the inter-CM path P1. Also in the third embodiment, as described above, since the data amount of the above-described information is small, even when a link abnormality or the like occurs in the inter-CM path P1, the above-described information can be transmitted from the CM #0 to the CM #1 without influencing the capacity unless link-down occurs.

On the other hand, in a case where the inter-control unit path P1 is in the link-down state, the suppression unit 12g' moves the above-described information from the CM #0 to which it belongs to CM #1 to which it does not belong through a inter-CM path P2 connecting one pair of CMs 11A and 11B so as to be communicable with each other, other than the inter-CM path P1. Here, as the inter-CM path (inter-control unit path; inter-CPU path) P2 other than the inter-CM path P1, for example, a path including the SAS path is used. More specifically, the inter-CM path P2 illustrated in FIG. 12 passes through the CPU 12", the PCIeSW, and the disk interface unit 15 of the CM #0 side, the communication channel 50 of the SAS, and the disk interface unit 15, the PCIeSW, and the CPU 12" of the CM #1 side.

[4-2] Operation of Modified Example of Third Embodiment

In the second and third embodiments described above, a case is assumed in which the inter-CM path P1 has a link abnormality but is at least in a link-up state, and the transmission of the above-described information between the CMs is performed using the inter-CM path P1 having the link abnormality. However, in a case where the inter-CM path P1 is in a link-down state, a path for communication between CMs disappears before the problem of the bottleneck of the capacity, the above-described information used for receiving host I/Os is not transmitted between the CMs, and the maintenance of each CM 11 is not able to be performed.

In the storage apparatus 1" of this embodiment, as inter-CM paths, in addition to the inter-CM path P1 passing through the communication channel 40 of the PCIe bus, there is the inter-CM path P2 passing through the communication channel 50 of the SAS.

Thus, in the modified example of the third embodiment, in a case where the inter-CM path P1 is in the link-down state, by changing the path in which the above-described information is transferred from the inter-CM path P1 to the inter-CM path P2, the above-described information is transmitted between CMs, and the maintenance of each CM 11 can be performed.

Next, the operation of the storage control device 10" illustrated in FIG. 13 will be described along a flowchart (Steps S11 to S21 and S23 to S28) illustrated in FIG. 13. The process of Steps S11 to S21 illustrated in FIG. 13 is similar to the process of Steps S11 to S21 illustrated in FIG. 5, and thus, description thereof will not be presented. Here, the process of Step S23 and subsequent steps illustrated in FIG. 13 from the No route of Step S20 will be described.

In a case where the transmittable communication amount C2 is determined to be equal to or less than the maximum communication amount Cmax by the determination unit 12d (C2≤Cmax; No route of Step S20), a communication amount of a level for which there is no influence on the capacity is not secured in the inter-CM path P1, and there is a possibility that a link abnormality causes a bottleneck of the capacity. In this case, the CM #0 waits for performing the maintenance of the suspicious CM #1, inserting the CM #1 after the maintenance into the storage apparatus 1", and completing the communication between CMs (No route of Step S23).

When the communication between CMs is completed (Yes route of Step S23), the CM #0 temporarily stops the issuance of an I/O request from the host apparatus 2 in Step S24. Thereafter, the suppression unit 12g' of the CM #0 determines whether or not the inter-CM path P1 is in the link-down state in Step S27. In a case where the inter-CM path P1 is not in the link-down state (No route of Step S27), in other words, the inter-CM path P1 has a link abnormality but is in the link-up state, the suppression unit 12g of the CM #0 moves the above-described information from the CM#0 to which it belongs to the CM #1 to which it does not belong in Step S25.

On the other hand, in a case where the inter-CM path P1 is in the link-down state (Yes route of Step S27), the suppression unit 12g' of the CM #0 moves the above-described information from the CM #0 to which it belongs to the CM #1 to which it does not belong through the inter-CM path P2 in Step S28.

Thereafter, the CM #0 fixes the issuance destination of the I/O request transmitted from the host apparatus 2 only to the CM #1 in Step S26. In this way, all the I/O requests from the host apparatus 2 are directly issued to the CM #1. Accordingly, I/O requests from the host apparatus 2 are not transmitted from the CM #0 to the CM #1 through the inter-CM path P1, whereby the communication between CMs is suppressed.

[4-3] Advantage of Modified Example of Third Embodiment

According to the storage control device 10" and the storage apparatus 1" of the modified example of the third embodiment, operations and advantages that are the same as those of the storage control devices and the storage apparatuses of the first to third embodiments can be acquired.

Particularly, according to the storage control device 10" and the storage apparatus 1" illustrated in FIG. 12, even when the inter-CM path P1 is in the link-down state, the above-described information used for receiving host I/Os is transmitted between CMs by using the inter-CM path P2 replacing the inter-CM path P1, and the maintenance of each CM 11 can be performed. Accordingly, a case is resolved in which the inter-CM path P1 is in the link-down state, and the maintenance is not able to be performed. Accordingly, the maintenance technique is improved, and a possibility that the operation of the storage apparatus 1" is stopped can be further lowered.

[5] Others

As above, while the preferred embodiments of the present invention have been described in detail, the present invention is not limited to such a specific embodiment, but various modifications or changes may be made therein within the range not departing from the concept of the present invention.

In addition, all or a part of the functions of the storage control devices 10, 10', and 10" including the functions as the first detection unit 12a, the reset control unit 12b, the second detection unit 12c, the determination unit 12d, the acquisition unit 12e, the calculation unit 12f, and the suppression unit 12g described above may be realized by executing a predetermined program using a computer (including a micro-processing unit (MPU), a CPU, and various terminals).

The program, for example, is provided in a form being recorded in a computer-readable recording medium such as a flexible disk, a CD (a CD-ROM, a CD-R, a CD-RW, or the like), a DVD (a DVD-ROM, a DVD-RAM, a DVD-R, a DVD-RW, a DVD+R, a DVD+RW, or the like), or a Blu-ray disk. In such a case, the computer uses the program by reading the program from the recording medium and transmitting the program to an internal storage device or an external storage device so as to be stored therein.

According to an embodiment, even in a case where a suspicious control unit in which an abnormality has occurred is erroneously specified, the maintenance of the suspicious control unit can be performed with the operation being continued.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device comprising:
a first control unit and a second control unit configured to control a storage unit in accordance with an input/output request from a host apparatus; and
a communication channel configured to connect between the first control unit and the second control unit to be communicable with each other,
wherein the first control unit includes:
an interface unit configured to be connected to the communication channel and control communication using the communication channel;
a first detection unit configured to detect an abnormality in an inter-control unit path including the interface unit of the first control unit, the interface unit of the second control unit, and the communication channel; and
a reset control unit configured to retract the second control unit and reset the interface unit of the first control unit in a case where an abnormality of the second control unit side is detected by the first detection unit.

2. The storage control device according to claim 1, wherein the first control unit further includes:
a second detection unit configured to detect a link abnormality of the first control unit side in the inter-control unit path, the link abnormality occurring in accordance with the resetting of the interface unit; and
a determination unit configured to determine whether or not maintenance using communication between the first control unit and the second control unit using the inter-control unit path can be performed based on a status of the link abnormality in a case where the link abnormality is detected by the second detection unit.

3. The storage control device according to claim 2, wherein the first control unit further includes:
an acquisition unit configured to acquire an amount of communication per unit time at the time of a normal operation in the inter-control unit path; and
a calculation unit configured to calculate a transmittable amount of communication per unit time in a state in which the link abnormality occurs based on the status of the link abnormality,
wherein the determination unit determines that the maintenance of the second control unit can be performed in a case where the transmittable amount of communication per unit time exceeds the amount of communication per unit time at the time of the normal operation and determines that the maintenance of the second control unit is not able to be performed in a case where the transmittable amount of communication per unit time is the amount of communication per unit time at the time of the normal operation or less.

4. The storage control device according to claim 3, wherein the acquisition unit acquires a maximum value of the amount of communication per unit time in the inter-control unit path after the start of an operation of the one control unit as the amount of communication per unit time at the time of the normal operation.

5. The storage control device according to claim 2, wherein the first control unit performs the maintenance of the first control unit and the second control unit using the inter-control unit path in a case where it is determined that the maintenance can be performed by the determination unit.

6. The storage control device according to claim 2, wherein the first control unit further includes a suppression unit configured to suppress the communication between the first control unit and the second control unit using the inter-control unit path in a case where it is determined that the maintenance is not able to be performed by the determination unit.

7. The storage control device according to claim 6, wherein the suppression unit suppresses the communication between the first control unit and the second control unit using the inter-control unit path by moving information used for receiving the input/output request issued by the host apparatus from the first control unit to the second control unit.

8. The storage control device according to claim 7, wherein the information used for receiving the input/output request issued by the host apparatus includes first logical unit information, which specifies a logical unit that is a management target of the first control unit, and second logical unit information, which specifies a logical unit that is a management target of the second control unit, that are maintained in the first control unit.

9. The storage control device according to claim 7, wherein the suppression unit moves the information from the first control unit to the second control unit through the inter-control unit path in a case where the inter-control unit path is in a state in which the link abnormality occurs and is in a link-up state.

10. The storage control device according to claim 7, wherein the suppression unit moves the information from the first control unit to the second control unit through a path, which connects between the first control unit and the second control unit to be communicable with each other, other than the inter-control unit path in a case where the inter-control unit path is in a link-down state.

11. A storage apparatus comprising:
a storage unit;
a first control unit and a second control unit configured to control the storage unit in accordance with an input/output request from a host apparatus; and
a communication channel configured to connect between the first control unit and the second control unit to be communicable with each other,
wherein the first control unit includes:
an interface unit configured to be connected to the communication channel and control communication using the communication channel;
a first detection unit configured to detect an abnormality in an inter-control unit path including the interface unit of the first control unit, the interface unit of the second control unit, and the communication channel; and
a reset control unit configured to retract the second control unit and reset the interface unit of the first control unit in a case where an abnormality of the second control unit side is detected by the first detection unit.

12. The storage apparatus according to claim 11, wherein the first control unit further includes:
a second detection unit configured to detect a link abnormality of the first control unit side in the inter-control unit path, the link abnormality occurring in accordance with the resetting of the interface unit; and
a determination unit configured to determine whether or not maintenance using communication between the first control unit and the second control unit using the inter-control unit path can be performed based on a status of the link abnormality in a case where the link abnormality is detected by the second detection unit.

13. The storage apparatus according to claim 12, wherein the first control unit further includes:
an acquisition unit configured to acquire an amount of communication per unit time at the time of a normal operation in the inter-control unit path; and
a calculation unit configured to calculate a transmittable amount of communication per unit time in a state in which the link abnormality occurs based on the status of the link abnormality,
wherein the determination unit determines that the maintenance of the second control unit can be performed in a case where the transmittable amount of communication per unit time exceeds the amount of communication per unit time at the time of the normal operation and determines that the maintenance of the second control unit is not able to be performed in a case where the transmittable amount of communication per unit time is the amount of communication per unit time at the time of the normal operation or less.

14. The storage apparatus according to claim 13, wherein the acquisition unit acquires a maximum value of the amount of communication per unit time in the inter-control unit path after the start of an operation of the one control unit as the amount of communication per unit time at the time of the normal operation.

15. The storage apparatus according to claim 12, wherein the first control unit performs the maintenance of the first control unit and the second control unit using the inter-control unit path in a case where it is determined that the maintenance can be performed by the determination unit.

16. The storage apparatus according to claim 12, wherein the first control unit further includes a suppression unit configured to suppress the communication between the first control unit and the second control unit using the inter-control unit path in a case where it is determined that the maintenance is not able to be performed by the determination unit.

17. The storage apparatus according to claim 16, wherein the suppression unit suppresses the communication between the first control unit and the second control unit using the inter-control unit path by moving information used for receiving the input/output request issued by the host apparatus from the first control unit to the second control unit.

18. The storage apparatus according to claim 17, wherein the information used for receiving the input/output request issued by the host apparatus includes first logical unit information, which specifies a logical unit that is a management target of the first control unit, and second logical unit information, which specifies a logical unit that is a management target of the second control unit, that are maintained in the first control unit.

19. The storage apparatus according to claim 17, wherein the suppression unit moves the information from the first control unit to the second control unit through a path, which connects between the first control unit and the second control unit to be communicable with each other, other than the inter-control unit path in a case where the inter-control unit path is in a link-down state.

20. A non-transitory machine-readable storage medium having stored therein a storage control program for causing a computer serving as a first control unit and a second control unit in a storage control device including the first control unit and a second control unit configured to control a storage unit in accordance with an input/output request from a host apparatus, a communication channel configured to connect between the first control unit and the second control unit to be communicable with each other, and an interface unit configured to be connected to the communication channel and control communication using the communication channel in the first control unit to execute a process comprising:

detecting an abnormality in an inter-control unit path including the interface unit of the first control unit, the interface unit of the second control unit, and the communication channel; and retracting the second control unit and resetting the interface unit of the first control unit in a case where an abnormality of the second control unit side is detected.

\* \* \* \* \*